United States Patent
Nosato et al.

(10) Patent No.: US 9,031,294 B2
(45) Date of Patent: May 12, 2015

(54) REGION SEGMENTED IMAGE DATA CREATING SYSTEM AND FEATURE EXTRACTING SYSTEM FOR HISTOPATHOLOGICAL IMAGES

(75) Inventors: Hirokazu Nosato, Ibaraki (JP); Hidenori Sakanashi, Ibaraki (JP); Masahiro Murakawa, Ibaraki (JP); Takumi Kobayashi, Ibaraki (JP); Tetsuya Higuchi, Ibaraki (JP); Nobuyuki Otsu, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 152 days.

(21) Appl. No.: 13/807,135

(22) PCT Filed: Jul. 22, 2011

(86) PCT No.: PCT/JP2011/066744
§ 371 (c)(1),
(2), (4) Date: Dec. 27, 2012

(87) PCT Pub. No.: WO2012/011579
PCT Pub. Date: Jan. 26, 2012

(65) Prior Publication Data
US 2013/0094733 A1 Apr. 18, 2013

(30) Foreign Application Priority Data
Jul. 23, 2010 (JP) ................................. 2010-166496

(51) Int. Cl.
*G06K 9/00* (2006.01)
*G06K 9/46* (2006.01)
*G06T 7/00* (2006.01)

(52) U.S. Cl.
CPC ............ *G06K 9/4671* (2013.01); *G06T 7/0012* (2013.01); *G06T 7/0081* (2013.01); *G06T 2207/10024* (2013.01); *G06T 2207/20144* (2013.01); *G06T 2207/30024* (2013.01)

(58) Field of Classification Search
None
See application file for complete search history.

(56) References Cited

U.S. PATENT DOCUMENTS 4,045,655 A 8/1977 Suzuki et al.
8,280,132 B2 * 10/2012 Madabhushi et al. ........ 382/128
(Continued)

FOREIGN PATENT DOCUMENTS

JP 50-068592 6/1975
JP 59-134846 8/1984
(Continued)

OTHER PUBLICATIONS

Nosato, H.; Sakanashi, H.; Murakawa, M.; Higuchi, T.; Otsu, N.; Terai, K.; Hiruta, N.; Kameda, N., "Histopathological Diagnostic Support Technology Using Higher-Order Local Autocorrelation Features," Bio-inspired Learning and Intelligent Systems for Security, 2009. BLISS '09. Symposium on , vol., No., pp. 61,65, Aug. 20-21, 2009 doi: 10.1109/BLISS.20.*

(Continued)

*Primary Examiner* — Tahmina Ansari
(74) *Attorney, Agent, or Firm* — Rankin, Hill & Clark LLP

(57) ABSTRACT

A region segmented image data creating system for histopathological images is provided. The region segmented image data creating system is capable of creating region segmented image data required to generating a region segmented image. A first bi-level image data creating section 12 creates first bi-level image data, in which nucleus regions can be discriminated from other regions, from histopathological image data. A second bi-level image data creating section 14 creates second bi-level image data, in which a background regions can be discriminated from other regions, from the histopathological image data. A three-level image data creating section 15 clarifies cytoplasm regions by computing a negative logical addition of the first bi-level image data and the second bi-level image data, and to create three-level image data as the region segmented image data.

22 Claims, 27 Drawing Sheets

(56) References Cited

U.S. PATENT DOCUMENTS

| | | | |
|---|---|---|---|
| 8,488,863 B2* | 7/2013 | Boucheron | 382/133 |
| 2006/0056654 A1 | 3/2006 | Yoda et al. | |
| 2006/0115146 A1* | 6/2006 | Ogura et al. | 382/159 |
| 2013/0016886 A1* | 1/2013 | Schoenmeyer et al. | 382/128 |
| 2013/0094733 A1* | 4/2013 | Nosato et al. | 382/128 |

FOREIGN PATENT DOCUMENTS

| | | |
|---|---|---|
| JP | 63-144257 | 6/1988 |
| JP | 2004-058737 | 2/2004 |
| JP | 2004-286666 | 10/2004 |
| JP | 2006-153742 | 6/2006 |
| JP | 2008-216066 | 9/2008 |
| JP | 2009-009290 | 1/2009 |

OTHER PUBLICATIONS

Erzhong Hu; Nosato, H.; Sakanashi, H.; Murakawa, M., "Anomaly detection for capsule endoscopy images using higher-order Local Auto Correlation features," Systems, Man, and Cybernetics (SMC), 2012 IEEE International Conference on, vol., No., pp. 2289,2293, Oct. 14-17, 2012 doi: 10.1109/ICSMC.2012.6378082.*

Demir, et al. "Automated Cancer Diagnosis Based on Histopathological Images: A Systematic Survey", Technical Report, TR-05-09, Rensselaer Polytechnic Institute (Mar. 2005), 16 pages.

Cosatto, et al., "Grading Nuclear Pleomorphism on Histological Micrographs", Proc. of the 19th International Conference on Pattern Recognition (ICPR2008), pp. 1-4 (Dec. 2008 in Tampa, Florida), 4 pages.

Otsu, et al., "A New Scheme for Practical Flexible and Intelligent Vision Systems", Proc. of IAPR Workshop on Computer Vision, pp. 431-435 (Oct. 1988 in Tokyo, Japan), 5 pages.

Nosato, et al., "Histopathological Diagnostic Support Technology using Higher-order Local Autocorrelation Features", Information Processing Society of Japan, The Special Interest Group Technical Report, MPS-73, vol. 2009, No. 19, pp. 161-164 (Mar. 2009), 4 pages.

Kurihara, et al., "Anomaly Detection from Pathology Image using Higher-order Local Autocorrelation Features", The Institute of Image Information and Television Engineers, Proc. of ITE Winter Annual Convention, p. 5-2, (Dec. 2009), 1 page.

Nanri, et al., "Unsupervised Abnormality Detection in Video Surveillance", International Association for Pattern Recognition, Proc. of Machine Vision Applications 2005, pp. 574-577 (May 2005 in Tsukuba, Japan), 4 pages.

Ota, "Color Engineering", published by Tokyo Denki University Press, (1993), 6 pages.

Otsu, "Mathematical Studies on Feature Extraction in Pattern Recognition", Researches of the Electrotechnical Laboratory, vol. 818 (1981), 22 pages.

Otsu, "An Automatic Threshold Selection Method based on Discriminant and Least Squares Criteria", Journal of the Institute of Electronics, Information and Communication Engineers, vol. J63-D, No. 4, pp. 349-356 (Apr. 1980), 8 pages.

Umeyama, et al., "Rotation Invariant Features Based on Higher-order Autocorrelations", Proc. of 45th Annual Conference (in 2nd season) of the Information Processing Society of Japan, 2, pp. 323-324, 2 pages.

Kobayashi, et al., "Color Image Feature Extraction Using Color Index Local Auto-Correlations", 2009 Institute of Electrical and Electronics Engineers (IEEE) International Conference on Acoustics, Speech and Signal Processing, pp. 1057-1060 (2009 in Taipei), 4 pages.

International Search Report, International Application No. PCT/JP2011/066744, date of mailing Nov. 1, 2011, 5 pages.

Japanese Office action dated Feb. 12, 2014 with English translation of arguments submitted on Apr. 10, 2014.

Japanese Office action dated Oct. 21, 2014 with English translation of Office action and English translation of arguments submitted.

Kenji Iwata et al., "A Histological Diagnosis System Using Higher-order Local Auto Correlation", English abstract included.

* cited by examiner

Fig.9

| INVARIANT FEATURES | HLAC FEATURES (MASK NO.) |
|---|---|
| $y_1$ | $x_1$ |
| $y_2$ | $x_2 + x_3 + x_4 + x_5$ |
| $y_3$ | $x_6 + x_7 + x_8 + x_9$ |
| $y_4$ | $x_{10} + x_{11} + x_{12} + x_{13} + x_{14} + x_{15} + x_{16} + x_{17}$ |
| $y_5$ | $x_{18} + x_{19} + x_{20} + x_{21} + x_{22} + x_{23} + x_{24} + x_{25}$ |
| $y_6$ | $x_{26}$ |
| $y_7$ | $x_{27}$ |
| $y_8$ | $x_{28} + x_{29} + x_{30} + x_{31} + x_{32} + x_{33} + x_{34} + x_{35}$ |

| EACH COORDINATE ASSUMING CENTER AS (0,0) |||
|---|---|---|
| $(-n, m)$ | $(0, m)$ | $(n, m)$ |
| $(-n, 0)$ | $(0, 0)$ | $(n, 0)$ |
| $(-n, -m)$ | $(0, -m)$ | $(n, -m)$ |

Fig.14
| DATA TYPE | CANCER/NORMAL | NO. OF SAMPLES |
|---|---|---|
| LEARNING DATA | CANCER | 250 |
| TEST DATA | NORMAL | 50 |
| | CANCER | 24 |
Fig.15A
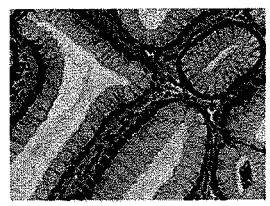
Fig.15B
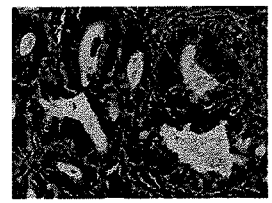

Fig.16

| PREPROCESSING TECHNIQUES | NO. OF GRADATIONS | NO. OF HLAC FEATURES | LEVEL VALUE |
|---|---|---|---|
| GRAY SCALE | 255 | 35 | 0 - 255 ACCORDING TO GRADATION LEVEL |
| OTSU'S BINARIZATION | 2 | 25 | LIGHT: 1, OTHERWISE: 0 |
| PROPOSED THREE-LEVEL ASSIGNMENT | 3 | 35 | NUCLEUS: 14, CYTOPLASM: 2, BACKGROUND: 0 |

*Fig.18*

| TECHNIQUES | FP (1 σ) | FN (1 σ) |
|---|---|---|
| GRAY SCALE | 13 | 1 |
| BINARIZATION | 43 | 0 |
| PROPOSED THREE-LEVEL ASSIGNMENT | 9 | 0 |

ORIGINAL GRAY SCALE

BINARIZED IMAGE WITH
V COMPONENT OF YUV

LOGICAL MULTIPLICATION OF
BINARIZED IMAGES ON EACH AXIS OF
PCA IN RGB COLOR SPACE

BINARIZATION ON
SECOND AXIS OF PCA OF CIELuv

| EACH COORDINATE ASSUMING CENTER AS (0,0) |||
|---|---|---|
| $(-n/\sqrt{2}, m/\sqrt{2})$ | $(0, m)$ | $(n/\sqrt{2}, m/\sqrt{2})$ |
| $(-n, 0)$ | $(0, 0)$ | $(n, 0)$ |
| $(-n/\sqrt{2}, -m/\sqrt{2})$ | $(0, -m)$ | $(n/\sqrt{2}, -m/\sqrt{2})$ |
| * ROUNDED TO THE CLOSEST WHOLE NUMBER |||

REGION SEGMENTED IMAGE DATA CREATING SYSTEM AND FEATURE EXTRACTING SYSTEM FOR HISTOPATHOLOGICAL IMAGES

TECHNICAL FIELD

The present invention relates to a region segmented image data creating system and feature extracting system for histopathological images.

BACKGROUND ART

Currently, in histopathological diagnosis performed as definitive diagnosis of cancers, clinical pathologists who have specialized knowledge and experience (hereinafter referred to simply as "pathologists") discriminate between tissues of normal and disease based on microscopic observation of histopathological specimens taken from patients through surgery or examination. Herein, the term "cancer" refers to general malignant neoplasm, and this term is discriminated from the term "malignant neoplasm arising from epithelial tissue" which is used as "gastric biopsy tissue".

In recent years, however, heavy burdens on the pathologists have become a serious social issue due to the increasing number of cancer patients and the severe shortage of pathologists. Based on the data published by the Center for Cancer Control and Information Services of the National Cancer Center, the number of patients newly diagnosed as having cancer every year is more than 500,000since 1998in Japan. In 2004,the newly-diagnosed cancer patients amounted to approximately 650,000which is about three times the number for 1975. The number of the cancer patients is expected to be furthermore increasing, and expected additional burdens imposed on the pathologists are of public concern. However, there are no cures for the pathologist shortage, and there is an urgent need for development of medical technologies to assist in reducing the burdens imposed on the pathologists.

As one of the solutions to the above-mentioned problem, a technique for automatic cancer diagnosis was proposed to extract features of the nuclei and cells from a histopathological image (refer to non-patent documents 1and 2). Information obtainable from the techniques disclosed in the non-patent documents 1and 2is significantly affected by the accuracy of clipping the nuclei.

Then, the inventors of the present invention proposed a pathological diagnosis support technique using higher-order local auto-correlation (HLAC) as another approach to solving the problem. For the proposed pathological diagnosis support technique, refer to non-patent documents 4and 5. For the HLAC, refer to non-patent document 3. The proposed technique allows feature extraction of a histopathological image without clipping the nucleus and cell contours. In an experiment according to the proposed technique, first, HLAC features were extracted from a histopathological image of a gastric biopsy and HLAC features were extracted from a normal histopathological image of a normal tissue. The HLAC features extracted from the normal histopathological image were subjected to principal component analysis to form a normal subspace (refer to non-patent document 6). Anomalies were detected by calculating a degree of deviation of the HLAC features extracted from the gastric biopsy histopathological image from the normal subspace. As a result of the experiment, histopathological images including malignant neoplasm arising from epithelial tissue were recognized as anomaly, as compared with the normal histopathological images which had been learned and were known to be non-cancerous. Thus, it was confirmed that the proposed technique was applicable to automatic diagnosis.

As disclosed in JP2006-153742A (patent document 1), typical color information on nuclei derived from many histopathological images is stored in advance. The color distribution is examined in a target histopathological image. A highly distributed portion is regarded as the center of a nucleus and clipped in a predetermined size. Then, the color information on the clipped portion is employed as the features of the target histopathological image.

As disclosed in JP2009-9290A (patent document 2), a histopathological image is converted into an HSV color space to obtain a saturation (S) component and a brightness (V) component. The saturation and brightness components are binarized by binarization method based on discriminant analysis, and then are logically multiplied. A region having a value of zero is regarded as a background. Further, the brightness (V) component is binarized by the binarization method based on discriminant analysis to extract a nucleus from the regions other than the background. In this conventional technique, a histogram of area ratio of a cytoplasm and a nucleus per cell is employed as a feature.

PRIOR ART DOCUMENTS

Patent Documents

Patent Document 1:JP2006-153742A
Patent Document 2:JP2009-9290A

Non-Patent Documents

Non-patent document 1:C. Demir and B. Yener, "Automated cancer diagnosis based on histopathological images: a systematic survey," Technical Report, TR-05-09,Rensselaer Polytechnic Institute, Mar. 2005.

Non-patent document 2:E. Cosatto, M. Miller, H. P. Graf and J. S. Meyer, "Grading Nuclear Pleomorphism on Histological Micrographs," Proc. of the 19th International Conference on Pattern Recognition (ICPR2008), pp. 1-4,Tampa, USA, Dec. 2008.

Non-patent document 3:N. Otsu and T. Kurita, "A new scheme for practical flexible and intelligent vision systems," Proc. IAPR Workshop on Computer Vision, pp. 431-435, Tokyo, Japan, Oct. 1988.

Non-patent document 4:H. Nosato, H. Sakanashi, M. Murakawa, T. Higuchi, N. Otsu, K. Terai, N. Hiruta, and N. Kameda, "Histopathological Diagnostic Support Technology using Higher-order Local Autocorrelation Features," Technical Report, IPSJ, MPS-73,vol. 2009,no. 19,pp. 161-164,Mar. 2009.

Non-patent document 5:T. Kurihara, H. Nosato, H. Sakanashi, M. Murakawa, T. Furuya, T. Higuchi, N. Otsu, K. Terai, N. Hiruta, and N. Kameda, "Anomaly Detection from Pathology Image using Higher-order Local Autocorrelation Features," Proc. of ITE Winter Annual Convention, p. 5-2,Dec. 2009.

Non-patent document 6:Takuya Nanri and Nobuyuki Otsu, "Unsupervised Abnormality Detection in Video Surveillance," Proc. IAPR Conf. on Machine Vision Application (MVA2005), pp. 574-577, Tsukuba, Japan, May 2005.

SUMMARY OF INVENTION

Technical Problem

In the conducted experiments, the techniques as disclosed in non-patent documents 5and 6yielded false-positive errors.

Not a few numbers of normal images were detected as anomaly suspected of being cancerous that should have been detected as normal. It is necessary to suppress such false-positive detection in order to effectively reduce the burdens imposed on the pathologists using these techniques.

In the conducted experiments, the technique disclosed in patent document 1 showed possible lowered accuracy of detecting nuclei since the tissue specimens are not always stained in a constant manner and it is not assured that the color of the target nucleus matches the predetermined typical color of a nucleus. Further, the information obtainable based on the technique of patent document 1 is significantly affected by the accuracy of clipping the nucleus.

The technique of patent document 2 has the following problem. If tissue specimens are lightly or not sufficiently stained, the distributions of S and V components are small over the whole image, which may lead to less accurate binarization. The technique employs as a feature the histogram of area ratio of a cytoplasm and a nucleus per unit area. Since the area ratio does not include information on shapes of the cytoplasm and nucleus, the histogram cannot be considered to appropriately represent the nature of the histopathological specimen.

An object of the present invention is to provide a region segmented image data creating system for histopathological images, which is capable of creating a region segmented image data required to generate a region segmented image with a background region, a cytoplasm region, and a nucleus region more clearly discriminated than ever.

Another object of the present invention is to provide a feature extracting system for histopathological images, with increased accuracy of image recognition.

Solution to Problem

The present application proposes a region segmented image data creating system for histopathological images, which is capable of creating from a histopathological image a region segmented image data that helps suppress false detection of anomalies, and also proposes a feature extracting system and method for histopathological images. The proposed feature extracting system and method utilize importance of a tissue used as a clue to diagnosis by a pathologist and nature specific to the histopathological image in order to extract features. According to the proposed system and method, a histopathological image is segmented into three regions, a nucleus region, a cytoplasm region, and a background. Then, the respective regions are assigned different numeric levels according to the importance of each region of the tissue. Thus, a three-level image is created. The histopathological image has no directional properties. Histopathological image features are extracted by extracting HLAC features from the histopathological image with consideration given to rotation and flip of the image.

In one aspect of the present invention, a region segmented image data creating system for histopathological images is provided. The region segmented image data creating system is capable of creating a region segmented image data required to generate a region segmented image, in which a background region, a cytoplasm region, and a nucleus region are clearly discriminated, from histopathological image data including background, cytoplasm, and nucleus. The histopathological image data is constituted from pixel data regarding a plurality of pixels representing the background, cytoplasm, and nucleus. The region segmented image data creating system includes a first bi-level image data creating section, a second bi-level image data creating section, and a three-level image data creating section. Typically, the first bi-level image data creating section is operable to create from the histopathological image data first bi-level image data in which the nucleus regions can be discriminated from the other regions. The second bi-level image data creating section is operable to create from the histopathological image data second bi-level image data in which the background regions can be discriminated from the other regions. The three-level image data creating section is operable to clarify a cytoplasm region by computing a negative logical addition of the first bi-level image data and the second bi-level image data, and then create three-level image data as the region segmented image data.

According to the present invention, the nucleus regions can be discriminated from the other regions in the first bi-level image data. The background regions can be discriminated from the other regions in the second bi-level image data. Negative logical addition of the first and second bi-level image data discriminates the cytoplasm regions. Thus, three-level image data is created as the region segmented image data. In the thus created region segmented image data, the background, cytoplasm, and nucleus regions can clearly be discriminated. In region segmentation of three sorts of regions, focus is placed on two distinct regions among the three regions. Then, one bi-level data, in which one of the two distinct regions can be discriminated from the other regions, is created by an appropriate method for the one distinct region. Another bi-level data, in which the other distinct region can be discriminated from the other regions, is created by an appropriate method for the other distinct region. Then, negative logical addition of these two bi-level data can clarify an indistinct region which has no distinct feature for classification. The indistinct region now becomes distinct. The combination of the already segmented regions and the newly-clarified region can output an image in which three sorts of regions are clearly discriminated.

In one or more embodiments, the first bi-level image data creating section may be configured to create the first bi-level image data in which the nucleus regions can be discriminated from the other regions by separating an R component from RGB image data of the histopathological image and binarizing the separated R component by the binarization method based on discriminant analysis. Here, the RGB image data refers to image data for which three elements of a red component signal (R), a green component signal (G), and a blue component signal (B) represent colors.

If a B component is subtracted from an R component in an RGB color space in respect of each pixel of the histopathological image and a subtraction result is equal to or less than zero, a pixel value of the pixel may be set to zero (0). Thus, redundancy of the RGB image data is reduced and information is accordingly reduced from the RGB image data. The RGB image data thus obtained may be used in the first bi-level image data creating section. In this manner, the redundant component removal and information reduction can remove pixel information containing many B components which may be an obstacle to extraction of the nucleus region. Further, when an R component is subtracted from a B component in the RGB color space in respect of each pixel contained in the RGB image data of which redundancy has been reduced and a subtraction result is more than a predetermined value, the RGB image data may be subjected to clipping in such a manner that the B component falls within a predetermined region so that the subtraction value becomes the predetermined value. The RGB image data thus clipped may be used in creating the first bi-level image data. Clipping may significantly reduce the noise reflected on the histopathological specimen image and the effect of non-uniform staining within the histopathological specimen image.

In one or more embodiments, the second bi-level image data creating section maybe configured to create the second bi-level image data in which the background regions can be discriminated from the other regions by separating a V component from YUV image data of the histopathological image and binarizing the separated V component by the binarization method based on discriminant analysis. Here, the YUV image data refers to image data for which three elements of a brightness signal (Y), a blue component differential signal (U), and a red component differential signal (V) represent colors. More specifically, in this case, the second bi-level image data creating section may be configured to separate the V component from the YUV image data of the histopathological image by projecting all of pixel data of the YUV image data with respect to a V axis in a YUV color space. As described so far, the RGB image data and the YUV image data are different in data type. The first and second bi-level image data respectively obtained from the RGB image data and the YUV image data contain components which individually discriminate the cytoplasm, background, and nucleus regions, thereby allowing the three-level image data creating section to discriminate the cytoplasm region.

Alternatively, the second bi-level image data creating section may be configured to create the second bi-level image data in which the background regions can be discriminated from the other regions by performing principal component analysis. More specifically, in this case, all of the pixel data of the histopathological image data are projected onto one of principal component analysis axes and then normalized. The normalized data are binarized by the binarization method based on discriminant analysis. For example, all of the pixel data of the histopathological image are projected onto the first principal component axis obtained by principal component analysis and are normalized. Then, the normalized data are binarized by the binarization method based on discriminant analysis to create the second bi-level image data. Alternatively, this process may be repeated with respect to different axes to obtain a plurality of bi-level image data. Then, the logical addition or logical multiplication of the thus obtained plurality of bi-level image data may be performed to obtain new bi-level image data. It has been known by experiments that the second bi-level image data obtained by the principal component analysis of the histopathological image data is better than the one obtained from the YUV image data in a sense that the background, cytoplasm, and nucleus regions can be discriminated more clearly. This is because the background regions can be separated from the other regions by quantizing the dispersion of pixel data in the color space along a maximizing axis.

Alternatively, the second bi-level image data creating section maybe configured to create the second bi-level image data in which the background regions can be discriminated from the other regions by performing the principal component analysis on CIELuv image data of the histopathological image and binarizing the results of the second principal component axis. Here, the CIELuv image data refers to image data represented by CIELuv color system as specified by the Commission International de l'Eclairage. The CIELuv color system is a uniform color space which is designed such that a distance in the color space may correspond to a difference in color perceived by a human. Therefore, region segmentation is enabled in a similar manner to human's (pathologist's) color perception.

For conversion from the RGB color system to the CIELuv color system, refer to "Color Engineering" by Noboru Ota, Tokyo Denki University Press, 1993, for example. According to this known technique, RGB color system data are converted to XYZ color system data; an L value is calculated based on a Y value; and u and v are calculated based on the L value and XYZ values.

In another aspect of the present invention, a feature extracting system for histopathological images is provided. The feature extracting system includes a higher-order local auto-correlation feature computing section, a component feature vector computing section, and a feature extracting section.

The higher-order local auto-correlation feature computing section is configured to apply a predetermined local pattern mask to a histopathological image created by the region segmented image data creating system for histopathological images, and to perform multiplication of pixel values in a plurality of mask candidates within a mask region for a local pattern mask. Then, the higher-order local auto-correlation feature computing section is configured to scan the local pattern mask over the whole image, and add up the multiplications of pixel values as a sum value for the histopathological image. Alternatively, the histopathological image is divided into a plurality of blocks. For each block, a sum value of the multiplications of pixel values is calculated while scanning the local pattern mask. The sum values of the respective blocks may be added as a total sum value for the histopathological image. Herein, the total sum value for the histopathological image is referred to as a feature.

For the local pattern mask, a mask region is defined as a matrix consisting of $(2m+1) \times (2n+1)$ cells where m and n are integers, and the $(2m+1) \times (2n+1)$ cells are defined as a plurality of mask candidates. A mask candidate located in the center of the mask region is selected as a center mask from the plurality of mask candidates. A local pattern mask is constituted from zero or more mask candidates selected from the mask region. As suggested in the "Mathematical Study on Feature Extraction in Pattern Recognition" by Nobuyuki Otsu, Technical Report, Electro Technical Laboratory, vol. 818, it is preferred that a plurality of local pattern masks be used, each consisting of the center mask, and zero, one, or two masks selected from eight mask candidates located at $\{(m, 0), (m, n), (0,n), (-m, n), (-m, 0), (-m, -n), (0,-n), (m, -n)\}$ positions within the mask region. The HLAC is characterized by correlation of mask candidates in terms of pixels present in local mask candidates confined in the mask region. Scanning using such local pattern masks over the entirety or part of an image may extract high quality features.

The above-cited document, "Mathematical Study on Feature Extraction in Pattern Recognition" suggests some guidelines for selecting mask candidates from the mask region. Arbitrary selection of mask candidates is possible according to various purposes. Especially when a plurality of local pattern masks are divided into a plurality of rotation-invariant feature groups, it is preferred that mask candidates be selected such that the distances from the respective candidates to the center mask are equal in order to increase rotation-invariant property. Accordingly, the quality of extracted features may furthermore be increased.

The positions (coordinates) of selectable mask candidates other than the center mask can be defined as integer coordinates closest to an intersection of the following two equations.

$$(x^2/n^2)+(y^2/m^2)=1 \text{ and}$$

$$y=(m/n)x \text{ or } y=-(m/n)x \text{ or } y=0 \text{ or } x=0.$$

The component feature vector computing section obtains a component feature vector by concatenating features which are total sum values for the respective local pattern masks that are computed by the higher-order local auto-correlation feature computing section.

The component feature vector computing section may be configured to obtain a component feature vector by grouping a plurality of local pattern masks considered to be equivalent to each other into the same invariant group when the plurality of the local pattern masks are individually rotated or flipped, computing a weighted sum of features obtained from all of the local pattern masks belonging to one invariant feature group, and concatenating the weighted sums for the respective invariant groups. Here, an angle of rotation may be 45°, 90°, 180°, etc. The direction of flip may be longitudinal (X-axis symmetry), lateral (Y-axis symmetry), and diagonal (origin symmetry), or any combinations thereof.

The feature extracting section is configured to generate a final feature vector by combining a plurality of component feature vectors which have been obtained from a plurality of collections of local pattern masks having size-different mask regions with variable values of m and n. The mask region of a local pattern mask collection is defined with a pair of terms, (m, n). If there are a plurality of pairs of terms (for example, p pairs) like (m1, n1), (m2,n2), and (mp, np), a plurality of component feature vectors (in this case, p component feature vectors) are generated, and the vector length of the final feature vector is p times the length of the individual component feature vector.

The pathologists do not care the directional differences as well as the front-back difference in the pathological diagnosis based on histopathological images. According to the present invention, a plurality of local pattern masks considered to be equivalent to each other when rotated or flipped by 45° or multiples of 45° are grouped into one of a plurality of invariant groups, thereby reducing the features on which the diagnostic judgment is based and increasing the accuracy of image recognition more than ever. This is because the histopathological characteristics are converged on a few features without dispersing over a plurality of features derived when rotation and flip are taken into consideration.

The simplest method of computing HLAC features is to use pixel values in multiplication. This method makes a large difference in impact to be imposed on the features between pixels having a large value and pixels having a small value, which may lead to decreased quality of image features. Instead, an alternative method may use CILAC features. The alternative method accumulates combination frequency (the number of occurrences) of pixel values of the pixels located at mask positions without simply using the pixel values of the pixels located at mask positions in the multiplication. The pixels having a small value may have substantially the same impact to the CILAC features as the pixels having a large value do, thereby allowing extraction of features better representing the nature of the target without relying on the brightness of the image. Thus, judge accuracy may be increased using the CILAC features, compared to using the HLAC features.

If the local pattern masks which represent only the region of nucleus and the relationship between the regions of nucleus and cytoplasm are used when computing the CILAC features, namely, the local pattern masks including the background are ignored, (specifically, the local pattern masks with a circle symbol indicating the background in FIG. 29 are not used), the effect due to the area occupied by the background in the histopathological image can be eliminated, thereby allowing better extraction of the histopathological features.

In another aspect of the present invention, a feature extracting method for histopathological images is provided. The method implements the steps of: scanning a histopathological image individually using the local pattern masks belonging to a plurality of predetermined local pattern mask collections, and computing the total sums (features) for the respective local pattern masks; obtaining a weighted sum of the total sums which have been obtained from scanning using the local pattern masks belonging to the predetermined local pattern mask collections, by grouping a plurality of local pattern masks considered to be equivalent to each other when individually rotated or flipped by 45° or multiples of 45° into one of a plurality of invariant groups, and regarding the local pattern masks belonging to the same invariant feature group as one feature; generating a component feature vector obtained by concatenating the individual weighted sums and vectorizing them; and generating a final feature vector by concatenating the component feature vectors obtained from the local pattern mask collections, and extracting the features of the histopathological image.

The order of higher-order correlation may be zero (0), one (1), or two (2) and local displacement may be restricted around a reference point to nine directions, namely, no direction, up, down, left, right, right above, left above, right below and left below. Then, 35 local pattern masks may be used. In this case, there are eight invariant groups. The vertical or longitudinal distance, and the horizontal or lateral distance between the reference points, that is, the image correlation width may arbitrarily be determined by the user according to purposes. For example, when both the vertical and horizontal distances are 1, the correlation of pixels in a narrow matrix of 3×3 can be obtained. It is the vertical and horizontal image correlation width that defines a local pattern mask collection. A local pattern mask collections of (vertical, horizontal)=(1, 1) and a plurality of local pattern mask collection such as a local pattern mask collection of (vertical, horizontal)=(2, 2) may be used to generate a plurality of component feature vectors. These component vectors may finally be concatenated into a final feature vector.

BRIEF DESCRIPTION OF DRAWINGS

FIG. 9 shows the transformation of rotation-invariant and flip-invariant HLAC features based on HLAC features.

FIG. 14 shows datasets used in a verification experiment.

FIGS. 15A and 15B are normal (non-cancerous) and cancerous images, respectively.

FIG. 16 shows techniques used in a comparison experiment to verify the effectiveness of three-level images.

FIG. 18 is a table of the results of verification experiment.

DESCRIPTION OF EMBODIMENTS

Now, embodiments of the present invention will be described in detail below with reference to accompanying drawings. The embodiments are intended to suppress false detections when detecting anomalies from the histopathological image. Proposed herein are technologies of extracting higher-order local auto-correlation (hereinafter referred to as HLAC) features with consideration given to the importance of tissues on which the pathologists focus for diagnostic purposes and the nature specific to the histopathological image. Specifically, the histopathological image is segmented into three regions, nucleus, cytoplasm, and background. The importance levels of the three regions are represented in three numerics. Since the histopathological image has no directional properties, HLAC features are extracted from the histopathological image with consideration given to the rotation and flip of the image.

Figure 1:
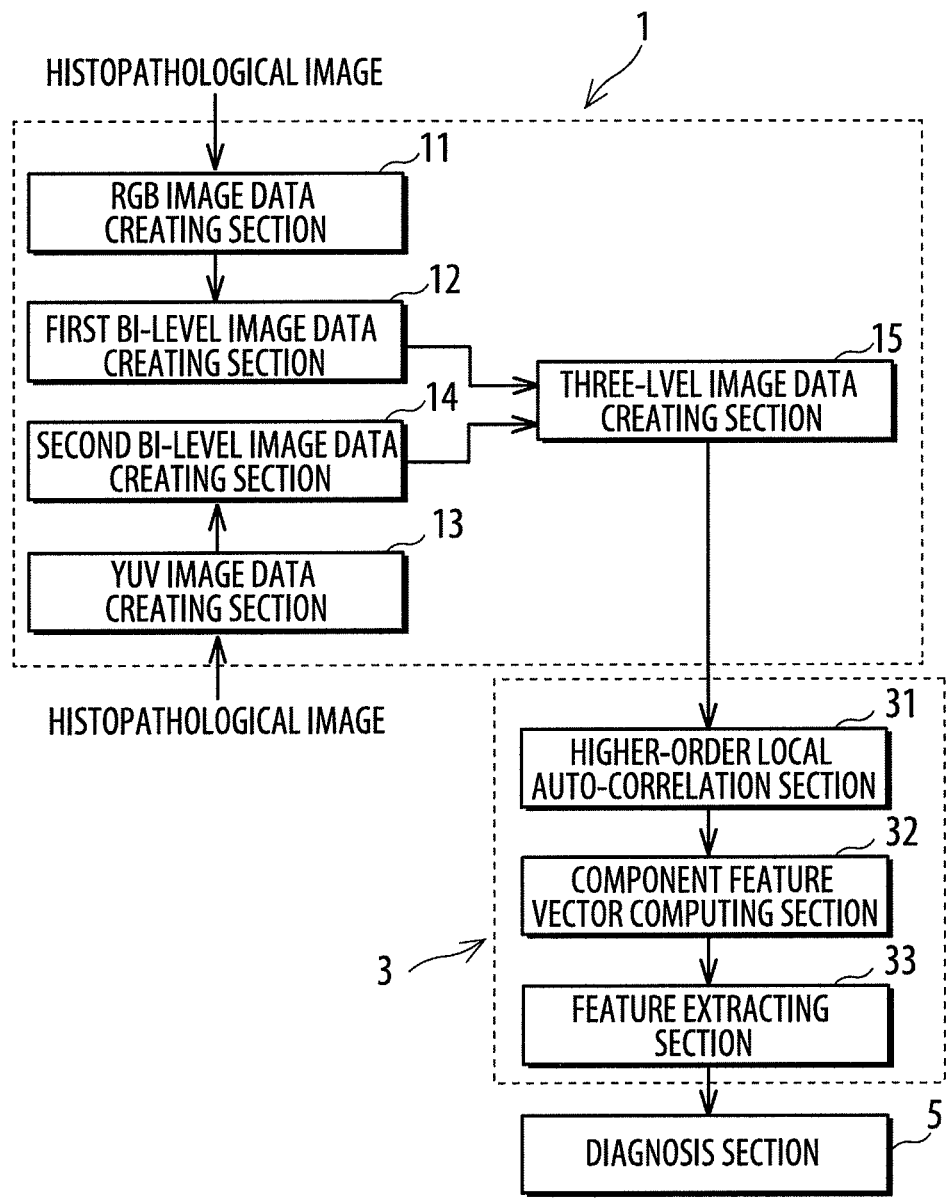
FIG. 1 is a block diagram illustrating a pathological diagnosis device including a region segmented image data creating system for histopathological images, a feature extracting system for histopathological images, and a diagnosis section in an embodiment of the present invention.
Figure 2:
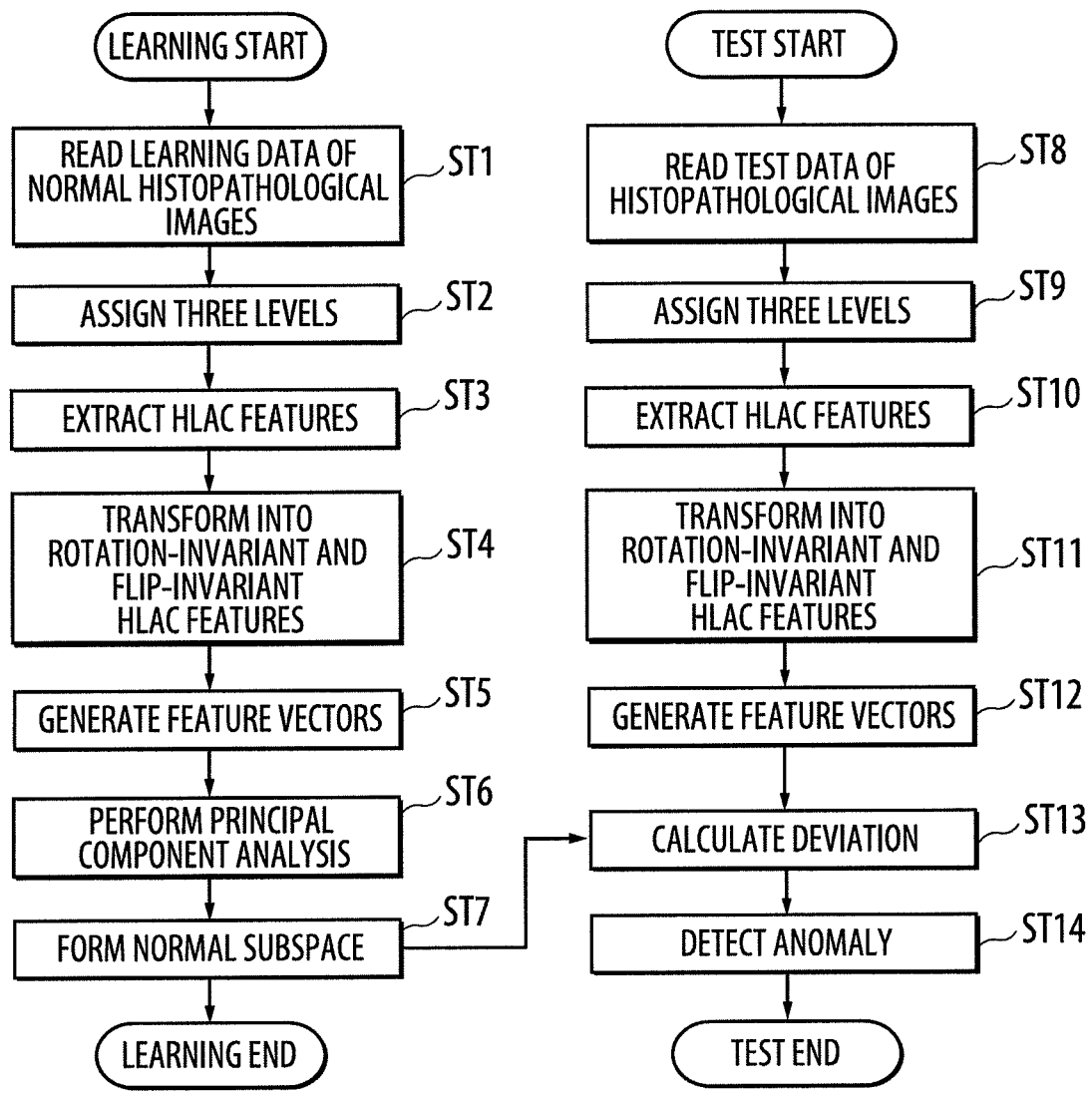
FIG. 2 is a flowchart showing an algorithm of a computer program used in implementing the pathological diagnosis device of FIG. 1 using a computer.
Figure 3:
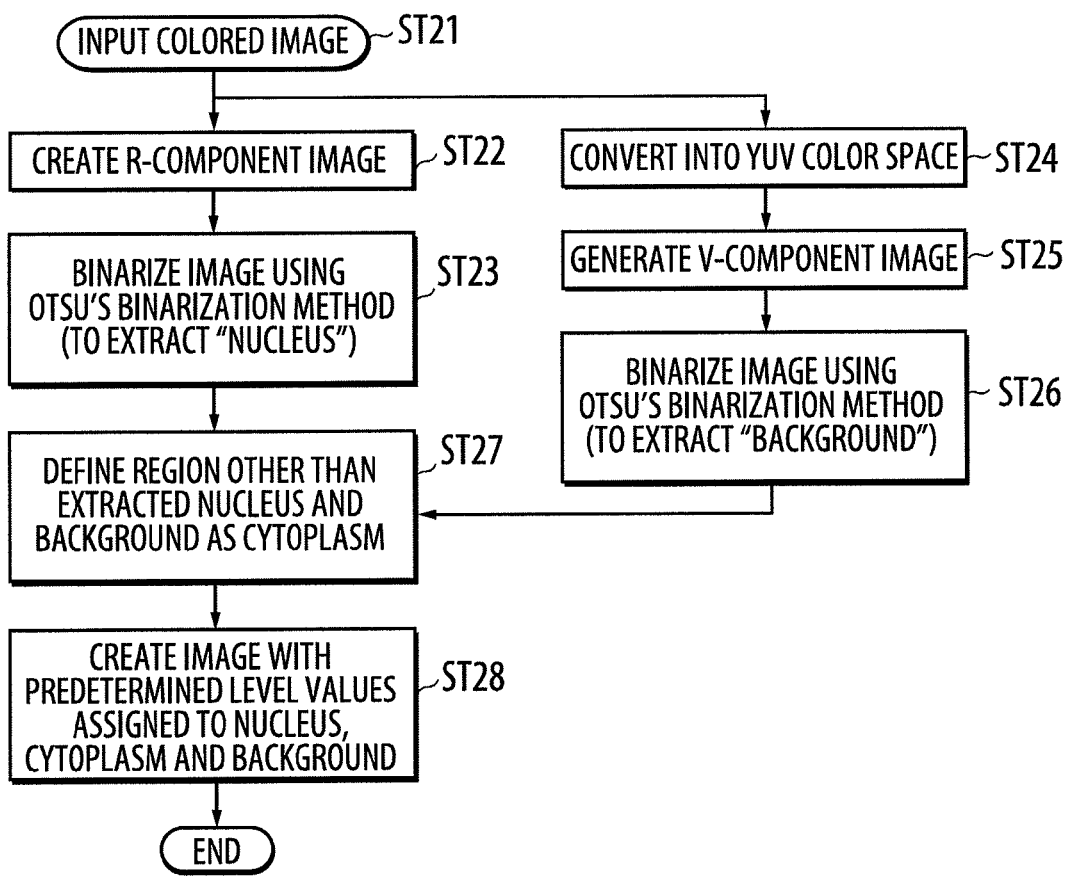
FIG. 3 is a flowchart showing an algorithm of a computer program used in implementing the region segmented image data creating system for histopathological images.

FIG. 1 is a block diagram illustrating a pathological diagnosis device including a region segmented image data creating system 1 for histopathological images, a feature extracting system 3 for histopathological images, and a diagnosis section 5. FIG. 2 is a flowchart showing an algorithm of a computer program used in implementing the pathological diagnosis device of FIG. 1 using a computer. FIG. 3 is a flowchart showing an algorithm of a computer program used in implementing the region segmented image data creating system 1 for histopathological images. The region segmented image data creating system 1 includes an RGB image data creating section 11, a first bi-level image data creating section 12, a YUV image data creating section 13, a second bi-level image data creating section 14, and a three-level image data creating section 15. The feature extracting system 3 for histopathological images includes a higher-order local auto-correlation feature computing section 31, a component feature vector computing section 32, and a feature extracting section 33. In FIG. 1, the diagnosis section 5 performs pathological diagnosis based on an output from the feature extracting system 3.

As shown in the flowchart of FIG. 2, the histopathological diagnosis is implemented through two phases: a learning phase consisting of steps ST1 to ST7 and a test phase consisting of steps ST8 to ST14. In the learning phase, a normal subspace is formed through learning using normal or non-cancerous histopathological images as learning data. First, in step ST1, normal histopathological images are read as the learning data. Next, in step ST2, the learning data are assigned three levels. In step ST3, HLAC features are extracted from the three-level images. Next, in step ST4, the HLAC features are transformed into rotation-invariant and flip-invariant HLAC features. After that, in step ST5, feature vectors are generated from the transformed features. Then, in step ST6, the feature vectors are subjected to principal component analysis, and in step 7, a normal subspace is formed, representing the normal histopathological images. In the test phase, cancerous histopathological images are read as test data in step ST8. Then, the histopathological image test data are assigned three levels in step ST9, and HLAC features are extracted from the three-level images in step ST10. Next, in step ST11, the HLAC features are transformed into rotation-invariant and flip-invariant HLAC features. After that, in step ST12, feature vectors are generated from the transformed features. Then, in steps ST13 and ST14, degrees of deviation from the normal subspace formed in the learning phase are calculated for the feature vectors to detect anomalies.

The region segmented image data creating system 1 and the feature extracting system 3 of FIG. 1 perform the steps ST1 to ST12 in the learning and test phases as shown in FIG. 2. The diagnosis section 5 of FIG. 1 performs steps ST13 and ST14 of FIG. 2. The region segmented image data creating system 1 especially performs assignment of three levels in steps ST2 and ST9. The first bi-level image data creating section 12 creates first bi-level image data, in which the nucleus regions can be discriminated from the other regions, for example from normal histopathological learning data and histopathological image test data. Specifically, the first bi-level image data creating section 12 reads RGB image data of the histopathological image from the RGB image data creating section 11. Here, the RGB image data refers to image data for reproducing an image with a variety of colors obtained by mixing primary colors of red (R), green (G), and blue (B). An R component is separated from the histopathological image data and the separated R component is binarized by the binarization method based on discriminant analysis. Thus, the first bi-level image data is created, in which the nucleus regions can be discriminated from the other regions. For example, separation of the R component may be performed by projecting all of pixel data of the RGB image data onto an R axis in an RGB color space. The binarization method described in the "Automatic threshold selection based on discriminant and least square criteria" by Nobuyuki Otsu, Journal of the Institute of Electronics, Information and Communication Engineers, vol. J63-D, no. 4,pp. 349-356,April 1980,may be used as the binarization method based on discriminant analysis. PI of FIG. 4 indicates an example histopathological image, and PI1 is the first bi-level image based on the first bi-level image data created by the first bi-level image data creating section 12. In PI, the nucleus region can be discriminated from the other regions. The histopathological image PI shows a histopathological specimen stained with hematoxylin which stains the nucleus region in violet-blue and eosin which stains the cytoplasm, fiber, erythrocyte, etc. in various light or dark red according to their respective natures (HE staining).

The second bi-level image data creating section 14 reads YUV image data of the histopathological image PI from the YUV image data creating section 13. Here, the YUV image data is a kind of a color space and refers to image data for representing a color with three elements of a brightness signal (Y), a differential signal for blue component (U), and a differential signal for red component (V).

The second bi-level image data creating section 14 creates second bi-level image data, in which the background regions can be discriminated from the other regions. Specifically, the second bi-level image data creating section 14 separates the V component form the YUV image data, and binarized the separated V component by the binarization method based on discriminant analysis. Thus, the second bi-level image data is created, in which the background regions can be discriminated from the other regions. More specifically, the second bi-level image data creating section 14 performs separation of the V component by projecting all of pixel data of the YUV image data onto a V axis in a YUV color space. PI2 of FIG. 4 shows a bi-level image based on the second bi-level image data.

The three-level image data creating section 15 creates a three-level image data as a region segmented image data by computing a negative logical addition of the first bi-level image data and the second bi-level image data. Assume that the nucleus region is "true1" and the other regions are "false" in the first bi-level image data, and the background region is "true2" and the other regions are "false" in the second bi-level image data. Then, the negative logical addition of the first and second bi-level image data results as follows: "true-false" is the nucleus region, "false-true" is the background region, and "false-false" is the cytoplasm region.

Figure 4:
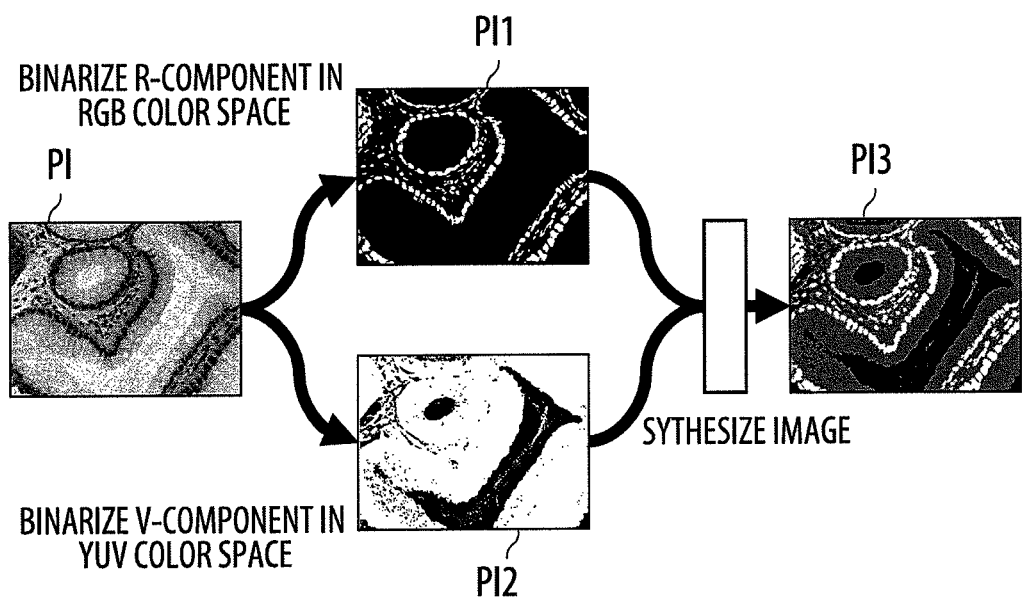
FIG. 4 graphically illustrates creation of a three-level image of a histopathological image.

PI3 of FIG. 4 shows a three-level image based on the three-level image data. The RGB image data and the YUV image data have different sorts of features. Accordingly, the first and second bi-level image data obtained from these two different image data contain different components capable of clarifying the nucleus and background regions. Thus, the three-level image data resulting from the first and second bi-level image data contains the background, cytoplasm, and nucleus regions which are more clearly discriminated.

The flowchart of FIG. 3 describes the steps of assignment of three levels for the histopathological image according to the importance of tissue. The assignment of three levels according to the present embodiment is intended to incorporate into feature extraction the importance of tissue and the nature specific to the histopathological image which the pathologists rely on for the diagnostic purposes. First, the histopathological image is segmented into three regions of nucleus, cytoplasm, and background. Then, numeric level values are assigned to the three regions according to the importance of the respective tissues. Preliminary experiments proved that there is a large difference in R component value between the nucleus region stained in violet-blue by HE staining and the other regions in the RGB color space. To extract the nucleus region, the R component of the histopathological image (refer to PI1 of FIG. 4) is separated in step ST22, and the separated R component is binarized using Otsu's binarization method in step ST23. As a result of the binarization, the nucleus region formerly stained in violet-blue but now in white is separated from the other regions in black as shown in PI1 of FIG. 4.

The background region is not HE stained and is shown in white having the highest brightness. The background region has little color information. The color information for the regions other than background is primarily a red component. Based on this knowledge, the background region is extracted using a V component in the YUV color space representing a color with brightness and a differential for red component in steps ST24 and ST25. Then, the V component of the histopathological image is also binarized by Otsu's binarization method in step ST26. As a result of the binarization, the non-stained background region is separated from the other regions, as shown in black in PI2 of FIG. 4. Finally, two PI images, PI1 with the nucleus regions separated from the other regions and PI2 with the background regions separated from the other regions, are integrated and synthesized into a region segmented histopathological image with three segmented regions of nucleus in white, cytoplasm in gray, and background in black as shown in PI3 of FIG. 4. The regions other than the extracted nucleus and background regions are defined as the cytoplasm in step ST27.

Figure 5:
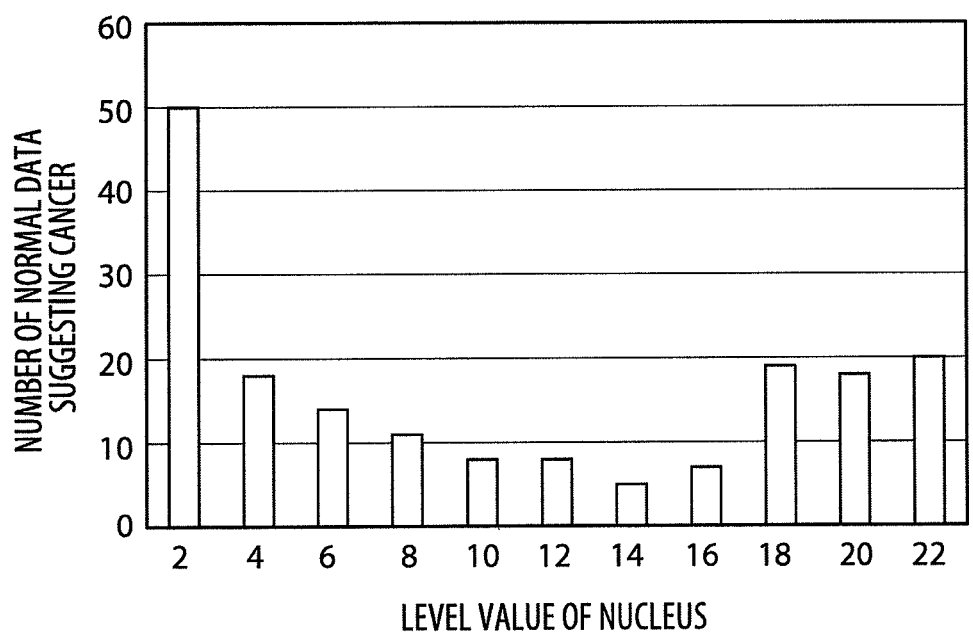
FIG. 5 illustrates the verification of level values optimal for a nucleus.

In step ST28, an image is created, in which predetermined level values are assigned to the pixels contained in the nucleus, cytoplasm, and background regions. In other words, the numeric level values defining the importance of the respective tissues are assigned to the pixels contained the segmented regions of the histopathological image. The pathologists primarily utilize the information on the nucleus and cytoplasm in a comprehensive manner for diagnostic purposes, but the most important information is nucleus information such as size and alignment. Taking account of the pathologists' viewpoints, appropriate level values are set to the pixels corresponding to the segmented nucleus, cytoplasm, and background regions. Thus, the importance of the features is reflected in the respective regions. In the present embodiment, a level value of zero (0) is assigned to the background, namely, zero is fixedly set to the value for pixels contained in the background region. A level value of two (2) is assigned to the cytoplasm, namely, two is fixedly set to the value for pixels contained in the cytoplasm region. Various level values are set to the pixels contained in the nucleus region. Preliminary experiments were conducted with the above-mentioned settings. Based on the results of the preliminary experiments as shown in FIG. 5, the following combination of level values showed the best classification of normal or non-cancerous and cancerous tissues: a level value of 14for the nucleus, a level value of 2for the cytoplasm, and a level value of 0for the background. When a level value of 14is set to the value for pixels contained in the nucleus region, a level value of 2is set to the value for pixels contained in the cytoplasm region, and a level value of 0is set to the value for pixels contained in the background region, the bet result was obtained. Therefore, these settings are employed in this embodiment.

Returning to FIG. 1, the feature extracting system 3 for histopathological images includes a higher-order local auto-correlation feature computing section 31, a component feature vector computing section 32, and a feature extracting section 33. The higher-order local auto-correlation feature computing section 31 performs steps ST3 and ST10 of FIG. 2.

Figure 6:
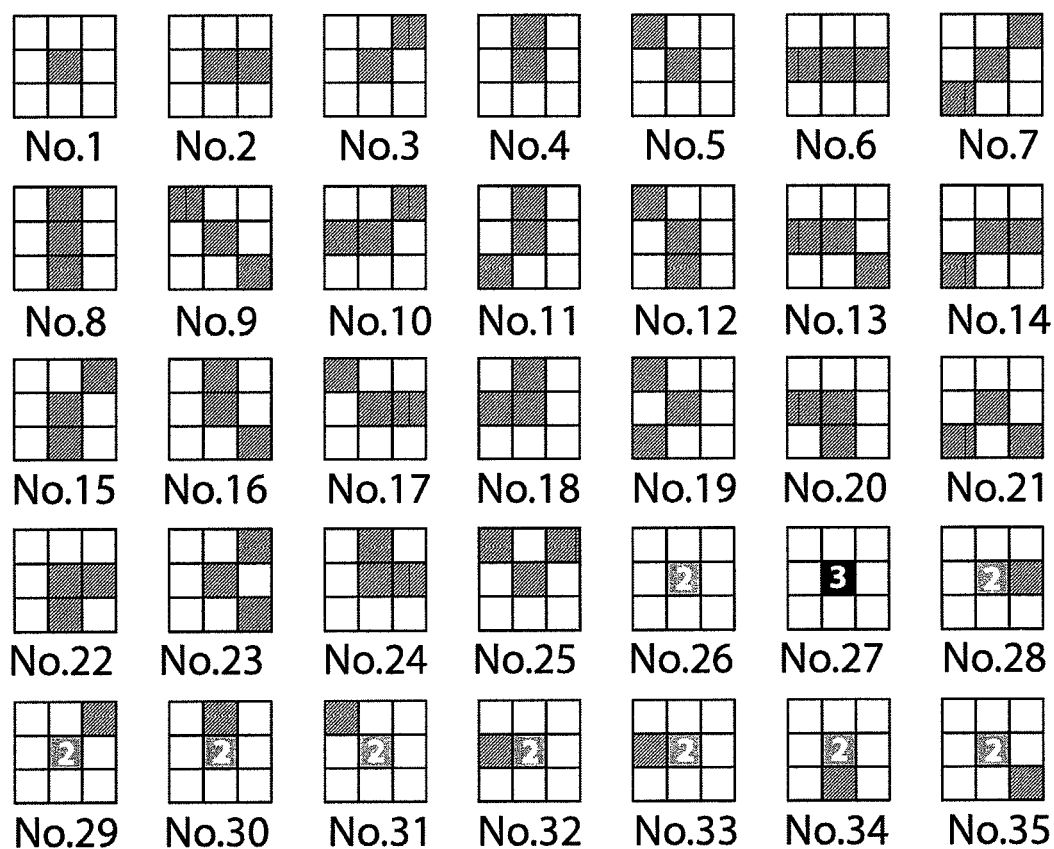
FIG. 6 illustrates example local pattern masks.

The higher-order local auto-correlation feature computing section 31 scans the three-level histopathological image PI3 shown in FIG. 6, which has been created by the region segmented image data creating system 1, by individually using 35 predetermined local pattern masks, and computes a total sum value (HLAC feature) for each local pattern mask. The component feature vector computing section 32 performs steps ST4 and ST11 of FIG. 2. The component feature vector computing section 32 obtains a component feature vector by concatenating and vectorizing the HLAC features. The feature extracting section 33 performs steps ST5 and ST12 of FIG. 2. The feature extracting section 33 generates a final feature vector by concatenating component feature vectors obtained from a plurality of local patter mask collections.

A feature obtained using each local pattern mask is defined as the following N-order auto-correlation function:

⟨Equation 1⟩

$$X_N(a_1, \ldots, a_N) = \sum_r f(r)f(r+a_1) \ldots f(r+a_N) \quad (1)$$

where f(r) denotes a three-level histopathological image, and a1,..., aN denote displacement directions.

In the present embodiment, for one target image, the order N of the higher-order local auto-correlation function is 0, 1, or 2 and the displacement direction a is limited to 9 directions of no direction, right, right above, up, left above, left, left below, down, and right below. 35-order vectors xi (i=0, ..., 35) calculated from 35 local pattern masks shown in FIG. 6 are computed as HLAC features. Nine-directional arrangement of mask candidates around one mask candidate in a mask region of 3×3 matrix form a basis for construction of the local pattern masks. The center mask is the reference point. All of the mask candidates located in the nine directions around the center mask inside the boundary of the mask region can be correlating points located in all of the displacement directions. Thus, in this case, all of the mask candidates can form the local pattern masks. For example, in the local pattern mask No. 6 of FIG. 6, the center mask is the reference point, two candidates right and left adjacent to the center mask are correlating points. In the local pattern mask no. 26 of FIG. 6, the center mask is the reference point and is also one correlating point. For example, in this case, assuming that the pixel value of a reference point in the target image is 5, the feature at the reference point is 5×5. Further, in the local pattern mask No. 27 of FIG. 6, the center mask is the reference point and is also a duplicate correlating point. In the local pattern mask No. 27, assuming, for example, that the pixel value of a reference point in the target image is 5, the feature at the reference point is 5×5×5. In FIG. 6, the number indicated in the mask denotes a power exponent according to the number of correlating masks.

The component feature vector computing section 32 performs steps ST4 and ST11 of FIG. 2. The component feature vector computing section 32 generates a component feature vector by concatenating a plurality of HLAC features obtained by scanning the image using a plurality of local pattern masks.

Further, the component feature vector computing section 32 may generate a component feature vector as follows: among a plurality of local pattern masks, local pattern masks which are considered to be equivalent to each other when individually rotated or flipped by a particular angle are regarded as belonging to the same invariant feature group; a weighted sum of the features obtained from the local pattern masks belonging to the same group is computed; and the weighted sums for the respective groups are concatenated. In this case, the component feature vector computing section 32 groups into the same invariant group a plurality of local pattern masks considered to be equivalent to each other when individually rotated or flipped. An angle of rotation, for example, is 45°, and may be 90° or 180°. The direction of flip may include vertical or longitudinal (X-axis symmetry), horizontal or lateral (Y-axis symmetry), and diagonal (origin symmetry) directions.

Figure 7:
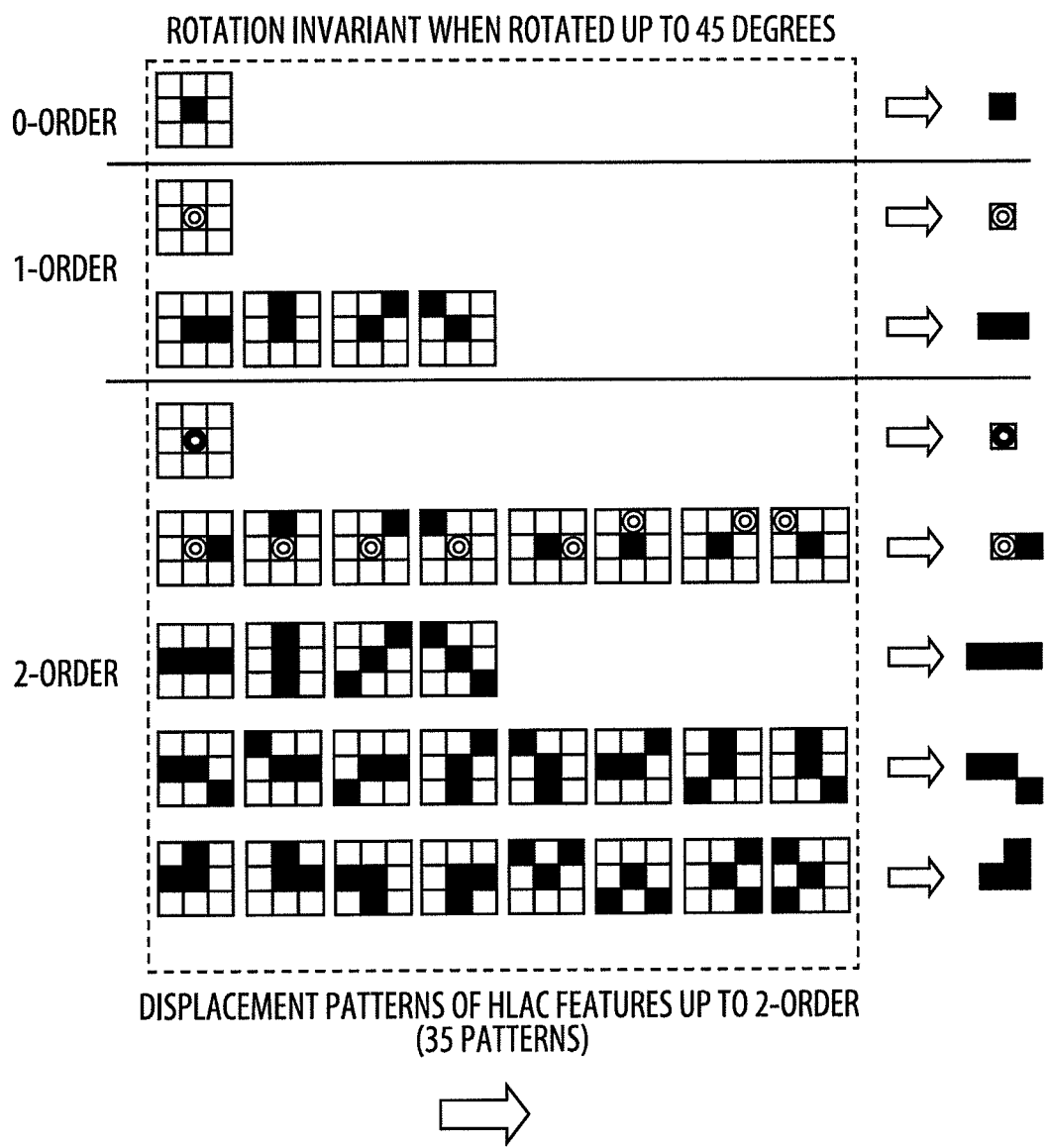
FIG. 7 illustrates displacement patterns up to two-order and rotation-invariant and flip-invariant patterns transformed from the two-order displacement patterns.

The local pattern masks of FIG. 6 are grouped into eight invariant feature groups according to a table of FIG. 7. In FIG. 7, the center mask in the mask region of 3×3 cells indicates the reference pixel position. If a zero-order local pattern mask is used, the feature is computed as a weighted sum of the pixel values of the pixels to which level values have been assigned in step ST28. If a one-order or two-order local pattern mask is used, the pixel value of the reference pixel located at the center mask is multiplied by the pixel value of the pixel located at the position defined by a mask candidate other than the center mask. Then, this multiplication is calculated over the whole image (or apart of the image) and the results of multiplications are summed. The summing result is the feature of the local pattern mask. In FIG. 7, a double circle means that the pixel value of the pixel specified by the mask candidate with a double circle is squared or raised to the second power. A triple circle means that the pixel value of the pixel specified by the mask candidate with a triple circle is cubed or raised to the third power.

A plurality of local pattern masks belonging to one and the same invariant feature group are regarded as one feature as shown in the rightmost column of FIG. 7. In the table of FIG. 7, there are one zero-order invariant feature group, two one-order invariant feature groups, and five two-order invariant feature groups. A weighted sum is calculated for a total sum value (features) obtained by scanning the target image individually using the local pattern masks belonging to the eight invariant feature groups. Namely, in an invariant feature group to which four local pattern masks belong, each of the four pattern masks is used in scanning the image to obtain a feature. The thus obtained features are summed or totalized as a feature of the one invariant feature group. With this, the histopathological images, in which the cells or nuclei having different orientations but the same shape, are understood as having the same nature. Therefore, the accuracy of image recognition can remarkably be increased.

Figure 8:
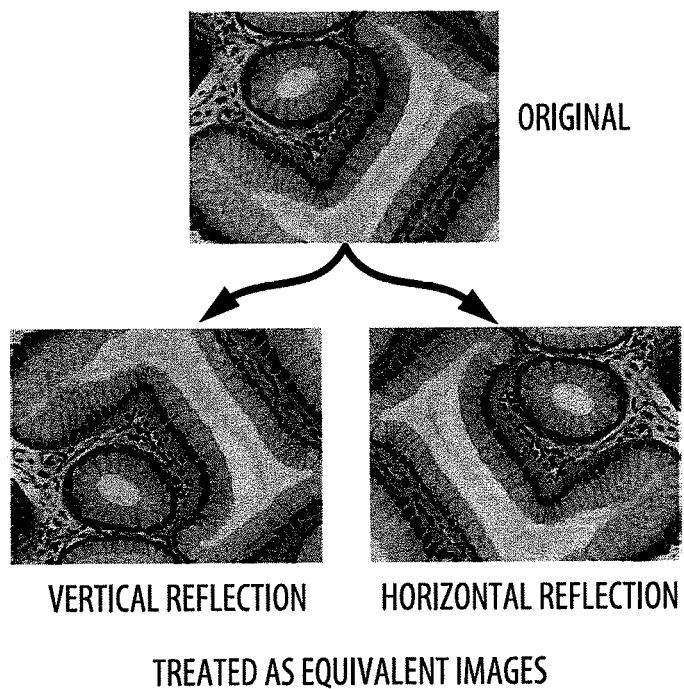
FIG. 8 showed that the histopathological image has no directional properties such as vertical, horizontal and rotation directions as well as heads-tails differences.

To explain specifically, a histopathological image has no directional properties such as vertical, horizontal, and rotation direction as shown in FIG. 8. Extracted HLAC features are transformed as rotation-invariant and flip-invariant features. In the present embodiment using the local pattern masks shown in FIG. 6, 8-order rotation-invariant and flip-invariant features yj (j=1, ..., 8) are transformed from extracted 35-order HLAC features xi (i=1, ..., 35) based on the weighted sum of features which can be considered as having the same correlation when rotation and flip are taken into consideration. The living tissue of the target histopathological image is configured principally in a circle or a curved shape. Rotation invariance is considered with π/4 radian (=45°) which can be represented by a local pattern mask of 3×3 pixels. Further, the histopathological image has no heads-tails differences, and flip invariance is also considered. As shown in FIG. 6, for example, the local pattern mask No. 6 is rotational symmetry of local pattern masks No. 7, No. 8 and No. 9. The weighted sum of these four features is calculated as one rotation-invariant and flip-invariant feature.

As reported in the "Rotation invariant features based on higher-order autocorrelation" by Shinji UMEYAMA and Takio KURITA, Proc. of the 45th National Convention of IPSJ, 2,pp. 323-324, March 1993,a conventional technique which considers rotation invariance with π/2radian (=90°) is used to transform 9-order invariant features from 25-order HLAC features of the bi-level image. As disclosed in JP2004-58737A, another conventional technique which considers rotation invariance with π/4radian (=45°) is used to transform 9-order invariant features from 25-order HLAC features of the bi-level image. However, either of the two publicly known references does not disclose an idea that extracted HLAC features are transformed into rotation-invariant and flip-invariant HLAC features based on the fact that a histopathological image has no directional properties in terms of vertical, horizontal, and flip directions. In the present embodiment, 8-order rotation-invariant and flip-invariant features yj (j=1, . . . , 8) shown in FIG. 9 are transformed from 35-order HLAC features xi (i=1, . . . , 35) with a π/4radian (=45°) optimal for the histopathological image structure.

The component feature vector computing section 32 generates a component feature vector by concatenating the features of the respective invariant feature groups. The feature extracting section 33 generates a final feature vector by concatenating a plurality of component feature vectors obtained from a plurality of local pattern mask collections having different mask sizes. The mask region of local pattern mask collection is defined by binomial pair (m,n). A plurality of component feature vectors, in this case, p component feature vectors are generated by preparing a plurality of binomial pairs (m,n) such as (m1,n1), (m2,n2), . . . , (mp,np). The length of the final feature vector is p times as long as the individual component feature vectors.

Figure 10A:
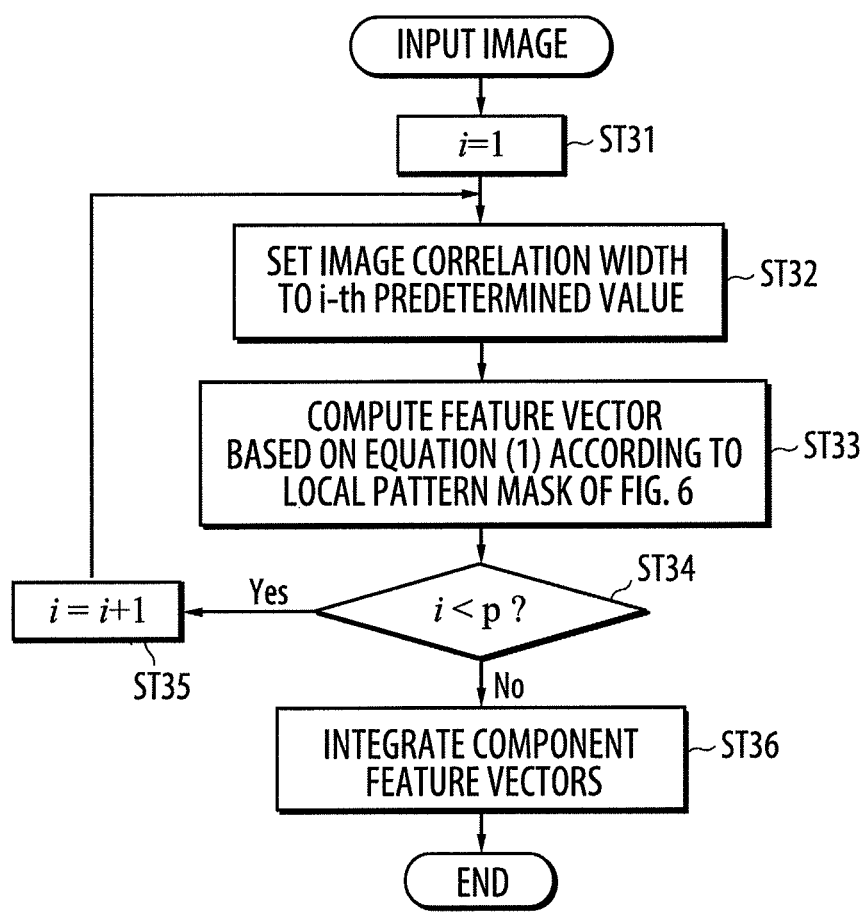
FIG. 10A is a flowchart showing detailed steps of steps ST3 to ST5 and ST10 to ST12 of FIG. 2.
Figures 10B, 10C:
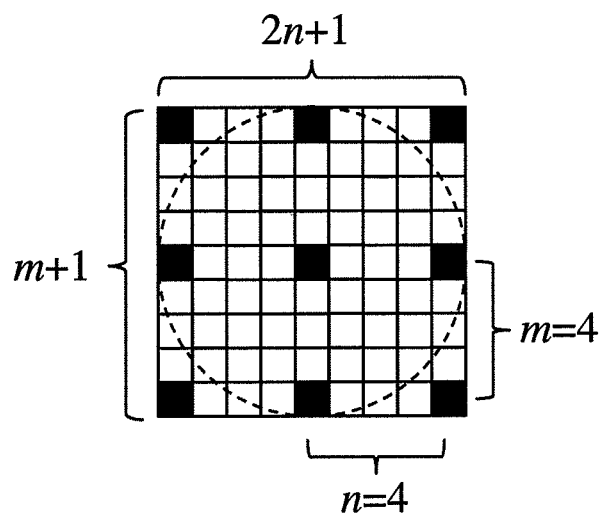
FIG. 10B illustrates how the correlation width of an image is determined.
FIG. 10C is a table of determined coordinates.

FIG. 10A is a flowchart showing detailed steps of steps ST3 to ST5 and ST10 to ST12 of FIG. 2. FIG. 10B illustrates how the correlation width of an image is determined. FIG. 10C is a table of determined coordinates. A plurality of local pattern masks is defined as follows. Among mask candidates in a mask region consisting of (2m+1)×(2n+1) cells arranged in a matrix where m and n are integers, one or more mask candidates are selected from a plurality of mask candidates located in a predetermined mask region centering around the center mask indicated as a black block. The selected mask candidates are defined as masks, in this case, 8shaded masks. In FIG. 10B, m=4and n=4. The "predetermined mask region" consists of a 9×9matrix. The Euclidean distance between the center mask and each mask candidate located at the corner of the predetermined mask region is longer than the Euclidean distance between the center mask and a mask candidate located in the middle of each side of the predetermined mask region. Therefore, the "image correlation width in the predetermined mask region" is defined as encompassing a difference between these two Euclidean distances. Assuming that the center mask is located at a coordinate of (0, 0), 8masks are located at coordinates shown in FIG. 10C.

In step ST31 of FIG. 10A, a variable i is set to one (1). In step ST32, among a plurality of image correlation widths that have been prepared in advance, the i-th image correlation width is set to a given value for scanning. Here, setting the first image correlation width to a given value means that the first pair of m and n is selected among the prepared pairs (m,n) in order to determine the mask region for scanning the histopathological image. In step ST33, a component feature vector is computed by the equation (1) using the local pattern masks shown in FIG. 6. In other words, the component feature vector is computed by concatenating the features obtained by scanning the image using the individual local pattern masks and vectorizing the concatenated features. In step ST34, it is examined if the value of i is equal to a given value p. If not equal, one is added to i in step ST35, and then steps 32 and 33 are repeated. If equal, a final feature vector is generated by concatenating the already-generated component feature vectors in step ST36. Step ST33 corresponds to steps ST3 and ST4, and steps ST10 and ST12 of FIG. 2.

Now, the formation of a normal subspace in step ST7 using the principal component analysis of step ST6 is explained below. In the present embodiment, a normal subspace is formed using the principal component analysis in order to detect a cancerous image as anomaly. The formation of a normal subspace is described in detail in the non-patent document 6. A normal subspace refers to a space formed by principal components of feature vectors extracted from a normal or non-cancerous learning image. In step ST13, a distance of the feature of a test histopathological image from the normal subspace is calculated as a degree of deviation. In step ST14, if a calculated degree of deviation is large, it means that the test histopathological image is different in nature from the non-cancerous image, which in turn implies an anomaly indicating possible cancer.

Figure 11:
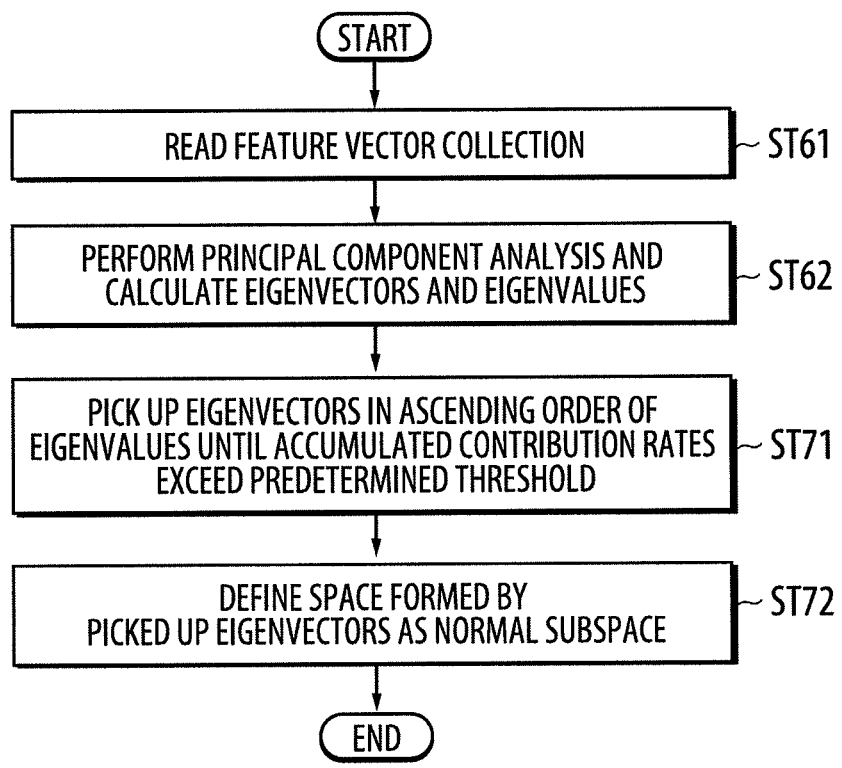
FIG. 11 is a detailed flowchart of steps ST6 and ST7 of FIG. 2.
Figure 12:
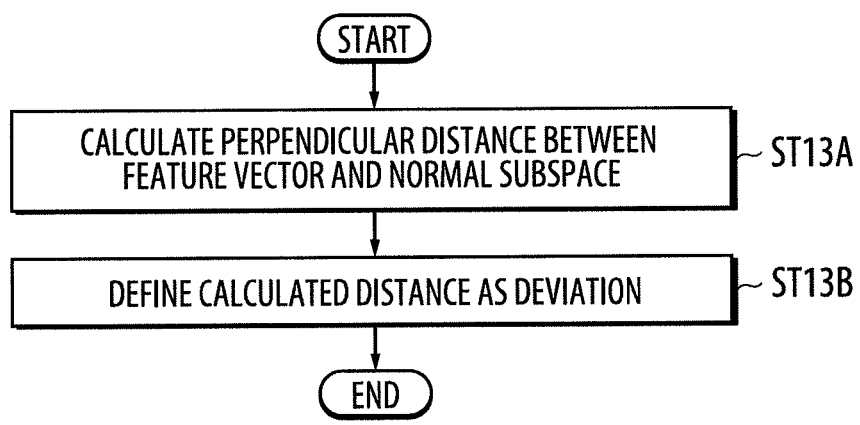
FIG. 12 is a detailed flowchart of step ST13 of FIG. 2.
Figure 13:
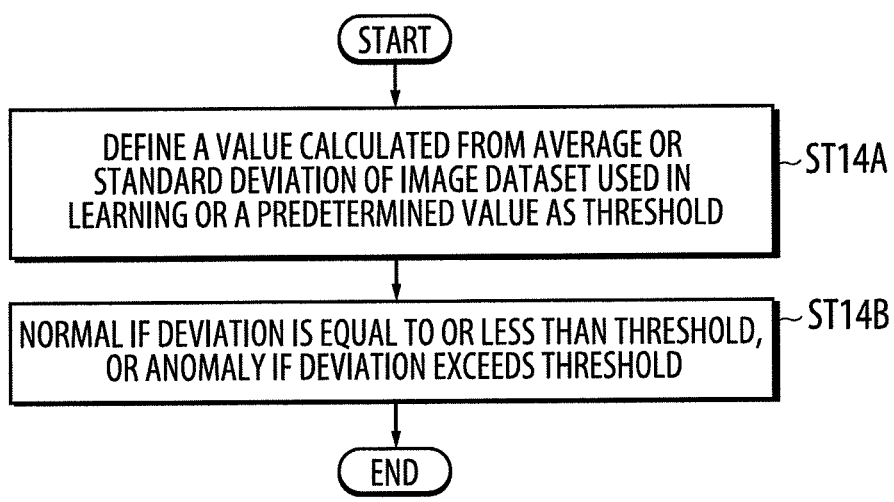
FIG. 13 is a detailed flowchart of step ST14 of FIG. 2.
Figure 17A:
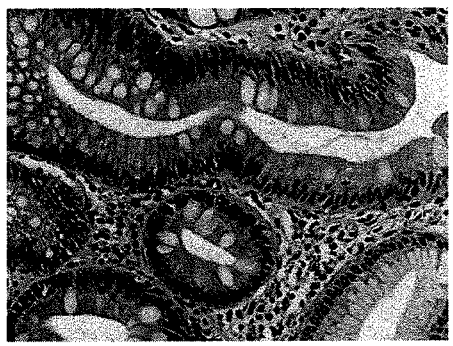
FIGS. 17A to 17D are an original image, a gray scaled image, a binarized image and a region segmented image obtained according to the present invention.
Figure 17B:
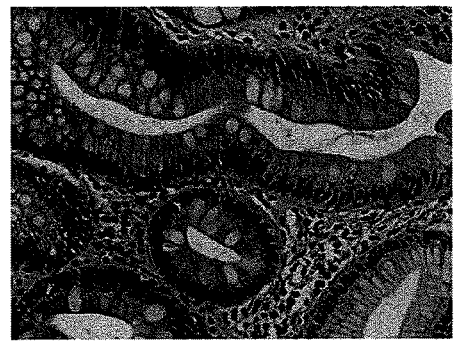
Figure 17C:
Figure 17D:
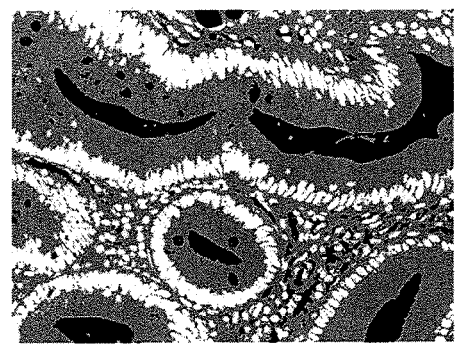

FIG. 11 is a detailed flowchart of steps ST6 and ST7 to form a normal subspace. FIG. 12 is a detailed flowchart of step ST13 of FIG. 2 to calculate a degree of deviation. FIG. 13 is a detailed flowchart of step ST14 of FIG. 2 to detect anomalies. First in step ST61, a collection of feature vectors, namely, rotation-invariant and flip-invariant feature vectors are read. In step ST62, the principal component analysis is applied to the rotation-invariant and flip-invariant feature vectors yj to obtain principal component vectors for forming the normal subspace. The principal component vectors can be obtained by solving an eigenvalue problem of an auto-correlation matrix Ry of feature vector collection {yj}. Normalized feature vectors obtained by normalizing the individual feature vectors may be used in place of the feature vectors.

<Equation 2>

$$R_y U = U A \quad (2)$$

In the above equation, U denotes an eigenvalue matrix where eigenvectors are columns of the matrix; A denotes a diagonal matrix where eigenvalues are diagonal elements. Here, an eigenvector corresponds to a principal component vector and an eigenvalue corresponds to a contribution rate which describes how much each principal component can describe the entire data. In step ST71, the eigenvectors are sorted in an ascending order of contribution rate.

Next, the number of order K which corresponds to the number of principal component vectors (namely, the above-mentioned eigenvectors) to form a normal subspace is determined. The numeric contribution rate describes how much the principal components contribute to representation of information on the analyzed data. The order K is defined in terms of the accumulated numeric contribution rates as follows:

⟨Equation 3⟩

$$\eta_K = \frac{\sum_{i=1}^{K} \lambda_i}{\sum_{i=1}^{M} \lambda_i} \quad (3)$$

In step ST72, the normal subspace is defined as a space formed by the eigenvectors $U_K = \{U_1, \ldots, U_k\}$ as base vectors according to the order K to satisfy the accumulated contribution rates of $\eta_K \leq C$. Here, C denotes an accumulated contribution rate, $\lambda_i$ denotes the contribution rate of a principal component vector $U_i$ and M denotes is the total number of eigenvalues.

Now, the calculation of degree of deviation and detection of anomalies in steps ST13 and ST14 will be described below. In the present embodiment, a distance between a feature extracted from the test histopathological image and the normal subspace obtained in the learning phase is defined as a degree of deviation which is used as an index for anomaly detection. In steps ST13A and ST13B of FIG. 12, the degree of deviation is calculated as the projective result of the normal subspace to the ortho-complement subspace. The projection operator P is represented as follows:

<Equation 4>

$$P = U_K U_K^T \quad (4)$$

In the above equation, $U_K^T$ is a displacement matrix and K denotes the order number.

The projection operator $P_\perp$ to the ortho-complement subspace is represented as follows:

<Equation 5>

$$P_\perp = I - P \quad (5)$$

where I denotes a unit matrix.

The distance $d_\perp$ of a projective result to the ortho-complement subspace is represented as follows:

<Equation 6>

$$d_\perp^2 = \|P_\perp y\|^2 = y^T(I - U_K U_K^T)y \quad (6)$$

In the above equation, y denotes a feature vector of the test histopathological image and $y^T$ denotes a displacement matrix of y. If normalized vectors are used in place of feature vectors to calculate the normal subspace, y must be normalized. In steps ST14A and ST14B of FIG. 13, anomaly detection of possible cancer can be done by comparing the distance $d_\perp$ as a degree of deviation with a predetermined threshold H.

Now, verification experiments to verify the effectiveness of the present embodiment will be described below. The following two experiments were conducted using actual histopathological images.

Experiment 1: Verification of Proposed Assignment of Three Levels

Experiment 2: Verification of Proposed Rotation Invariance and Flip Invariance

[Test Data for Experiments]

In the conducted experiments, histopathological images of the biopsy taken from patients were used. The biopsy samples were confirmed by the pathologists that some of them were clearly non-cancerous or normal and the others were clearly cancerous in order to verify that the cancerous histopathological image can properly be detected as anomaly through learning of non-cancerous or normal histopathological images.

FIG. 14 shows datasets used in the verification experiments. 250 samples, which were diagnosed as non-cancerous or normal by the pathologists, were used as the learning data. In addition to the learning data, 50 non-cancerous samples and 24 cancerous samples were used as test data. The histopathological images used in the experiments were taken by microscopy of 20 times power and stored in jpeg format of 1280× 960 pixels as the non-cancerous image shown in FIG. 15A and cancerous image shown in FIG. 15B.

[Evaluation Method for Verification]

In the verification experiments, after the normal subspace was formed using the learning data, the degree of deviation of the individual learning data were measured with respect to the normal subspace. The standard deviation ($\delta$) plus the average degree of deviation was used as a threshold. If the degree of deviation exceeded the threshold, the test data was detected as anomaly suggesting cancer.

In the evaluation of the experiments, if a non-cancerous test data exceeded the threshold, it was counted as False-Positive (FP). Then, the proposed method was evaluated, taking the number of false-positive detections into consideration. To satisfy the prerequisite, "cancer must not be overlooked during pathological diagnosis," if cancerous test data fell below the threshold, it was counted as False-Negative (FN). Thus, accuracy of cancer detection was evaluated.

[Verification Experiment 1: Verification of Effectiveness of Assignment of Three Levels]

To verify the effectiveness of the proposed three-level image technique used in the present embodiment, three techniques were used in comparison experiment as shown in FIG. 16. In this experiment, rotation and flip features were not transformed. The results from the accumulated contribution rates C of 0.999, 0.9999, and 0.99999 were compared with each other in the three techniques to find the best condition.

FIG. 17 shows an original image and gray scaled region segmented images of the respective techniques for visual comparison. FIG. 17A shows an original image. In the image of the proposed technique, the pixel values of nucleus, cytoplasm, and background were set to 255, 127, and 0 for display. FIG. 17B shows a gray scaled image which is the closest to the original image and the tissue structure may visually be discriminated clearly. FIG. 17C shows a bi-level image in which most of the cytoplasm regions are intermingled with the background regions. FIG. 17D shows an image obtained according to the proposed technique of the present embodiment in which the nucleus, cytoplasm and background regions are properly segmented.

FIG. 18 is a table of the results of verification experiments using the respective techniques. The proposed technique yielded the fewest FP (1$\delta$) and the effectiveness of the proposed technique could be verified. In the binarization method, the pixel gradation levels were fewer and the amount of information representing the histopathological features was smaller than the gray scale technique. It may be concluded that the number of FP was increased. Although the three gradation levels of the proposed technique were fewer than 256 gradation levels of the gray scale technique, the number of FP was decreased in the proposed technique. It follows from the foregoing that region segmentation of the nucleus, cytoplasm, and background regions and level assignment to the respective regions were effective. The gray scale technique yielded some false-negative FN (1$\delta$) detections of cancerous data, but the proposed technique could detect all cancerous data, thereby proving that accuracy of cancer detection was increased in the proposed technique.

[Verification Experiment 2: Verification of Effectiveness of Rotation Invariance and Flip Invariance]

To verify the effectiveness of the proposed technique which takes account of rotation invariance and flip invariance, the results of anomaly detection using non-transformed 35-order HLAC features were compared with the results of anomaly detection using transformed 8-order rotation-invariant and flip-invariant HLAC features. In this verification experiment, the accumulated contribution rates C of 0.999, 0.9999, and 0.99999 were compared with each other in the three techniques to find the best condition.

Figure 19A:
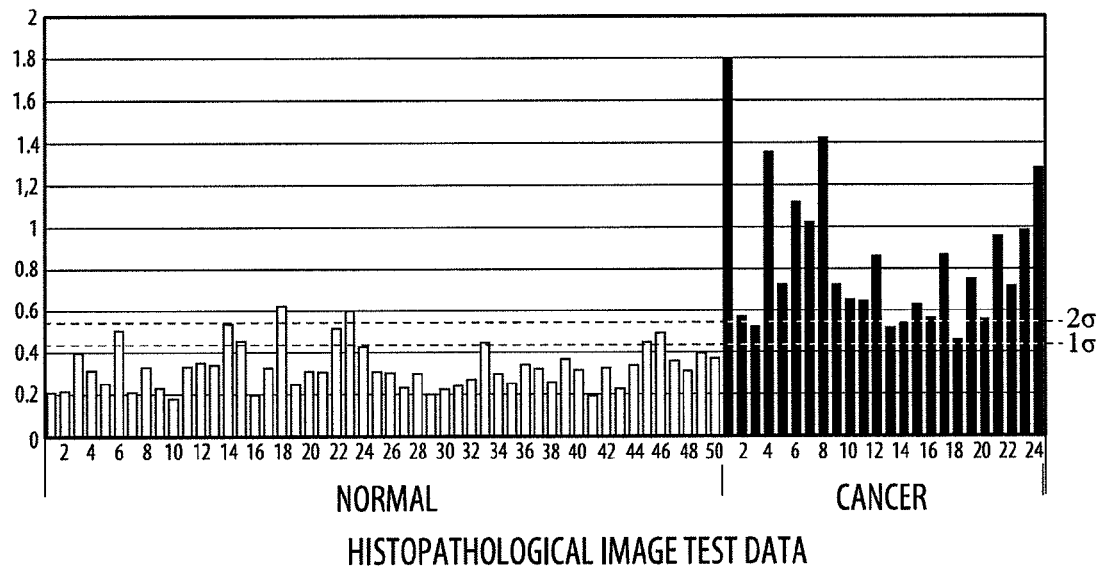
FIGS. 19A and 19B illustrate the results of verification experiment.
Figure 19B:
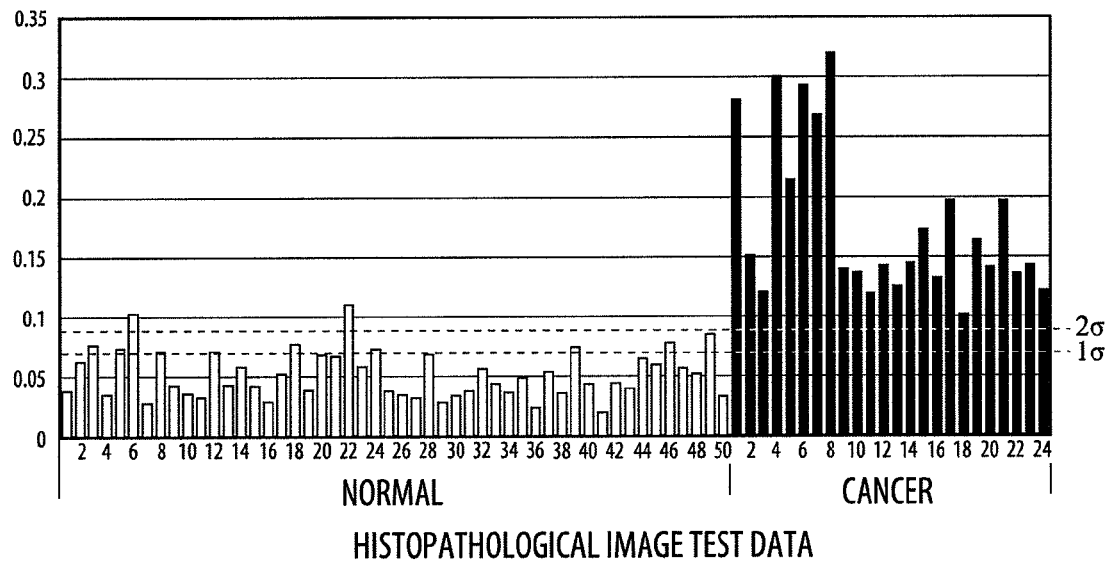

FIGS. 19A and 19B illustrate the results of verification experiments. The results are shown in graph where the standard deviation ($\delta$) plus the average as threshold is set to 1$\delta$ and the average+2×standard deviation ($\delta$) is set to 2$\delta$.

For the non-transformed HLAC features shown in 19A, it can be known from the experiment results that an allowance between the smallest degree of deviation and the threshold for the cancerous test data is very small when the threshold is set to 1δ, and that false negative detections amount to 4if the threshold is set to 2δ. For the transformed HLAC features with consideration given to rotation invariance and flip invariance as shown in FIG. 19B, an allowance between the threshold of 1δ and the smallest degree of deviation for the cancerous test data is sufficient, and that no false negative detection was made even when the threshold is 2δ. It follows from the foregoing that a great difference in degree of deviation was caused between the non-cancerous test data and the cancerous test data as a result of taking account of the rotation invariance and flip invariance. Thus, it was confirmed that accuracy of anomaly detection of cancer was sufficiently secured.

Figure 20:
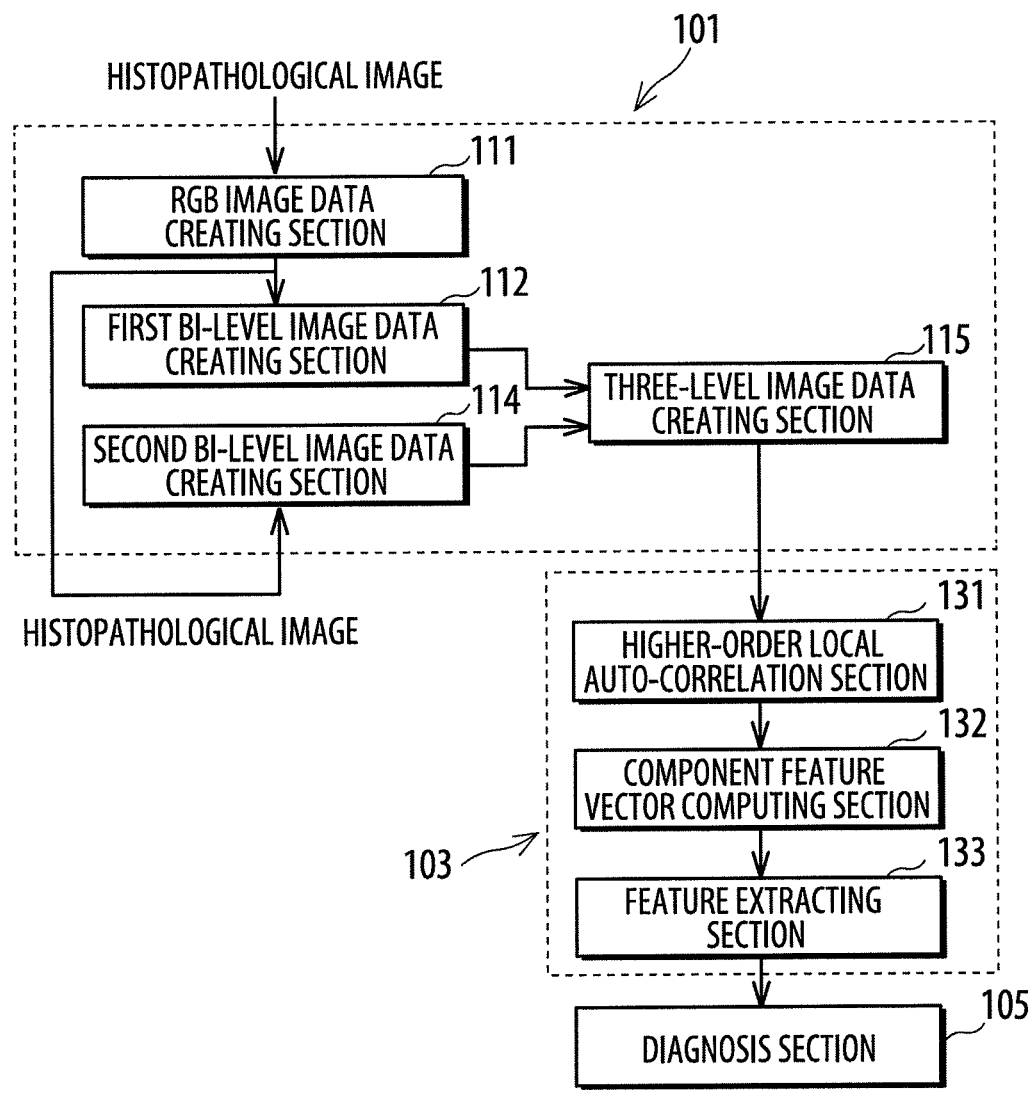
FIG. 20 is a block diagram illustrating of a pathological diagnosis device in another embodiment of the present invention.
Figure 21:
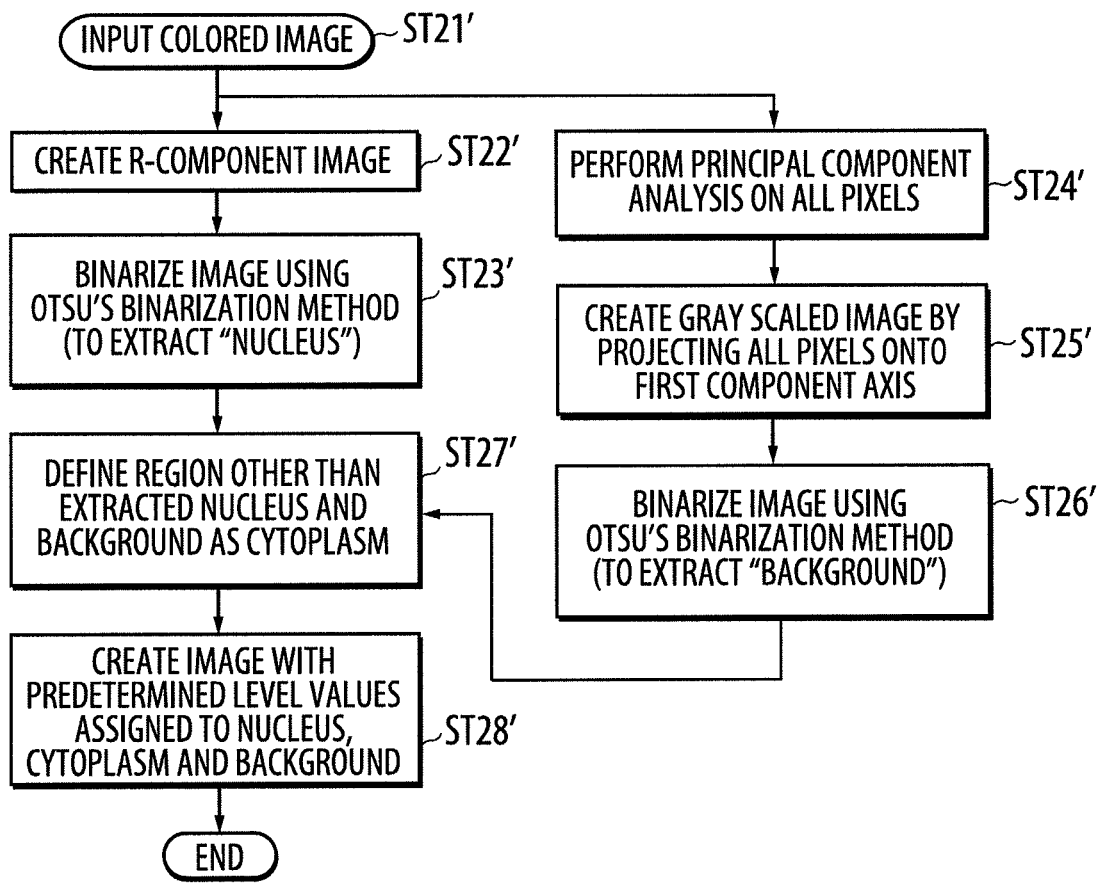
FIG. 21 is a flowchart showing an algorithm of creation of three-level images to be implemented in software used in the pathological diagnosis device of FIG. 20.

FIG. 20 is a block diagram illustrating of a pathological diagnosis device in another embodiment of the present invention. The pathological diagnosis device includes a region segmented image data creating system 101 for histopathological images that is different from the region segmented image data creating system 1 of FIG. 1, a feature extracting system 103 for histopathological images, and a diagnosis section 105. FIG. 21 is a flowchart showing an algorithm of assignment of three levels to be implemented in software used in the pathological diagnosis device of FIG. 20.

In the embodiment of FIG. 20, principal component analysis is employed to segment the histopathological image into a nucleus region, a cytoplasm region, and a background region without relying on the staining conditions of a specimen. This embodiment is different from the embodiment of FIG. 1 in that a second bi-level image data creating section 114 is configured to create second bi-level image data in which the background regions can be discriminated from the other regions by performing the principal component analysis on all of pixel values of the histopathological image data. In other regards, the present embodiment is the same as the embodiment of FIG. 1. The parts of the embodiment of FIG. 20 are allocated reference numbers defined by adding 100to reference numbers of the counterparts of FIG. 1, and descriptions thereof are omitted.

More specifically, the second bi-level image data creating section 114 used in the present embodiment is configured to create the second bi-level image data by performing the principal component analysis on all of pixel values of the histopathological image to obtain a first principal component axis, projecting all the pixel data of the histopathological image onto the first principal component axis for normalization, and binarizing the normalized pixel data by the binarization method based on discriminant analysis. Of course, the normalized pixel data obtained by projecting all of the pixel data of the histopathological image onto a principal component axis other than the first principal component axis may be binarized by the binarization method based on discriminant analysis to create second bi-level image data. Further, the normalized pixel data obtained by projecting all of the pixel data of the histopathological image onto a plurality of principal component axes may be binarized by the binarization method based on discriminant analysis to obtain a plurality of bi-level image data. Then, logical multiplication may be performed on the plurality of bi-level image data to obtain the second bi-level image data. Further, logical addition or other operations may be performed to obtain the second bi-level image data.

Figure 22:
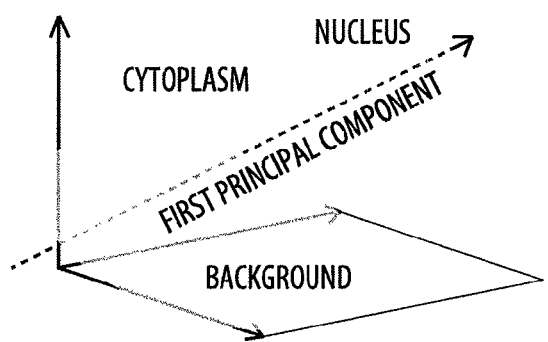
FIG. 22 conceptually illustrates principal component analysis.

A first principal component direction is obtained by performing the principal component analysis on all of the pixels in step ST24'. As shown in FIG. 22, the first principal component direction with respect to the pixel distribution in the three-dimensional RGB color space is the direction in which the dispersion becomes maximal when all of the pixels data are projected along an axis coinciding with this direction. In this direction, the lightest colored pixel distribution (which is the background) and the darkest colored pixel distribution (which is the nucleus and cytoplasm) can be best separated from each other. Then, a gray scaled image obtained from normalization of the pixels by projecting the pixels onto that axis is binarized by the binarization method based on discriminant analysis proposed by Otsu in steps ST25' and ST26', thereby allowing the background to be clipped.

In the present embodiment, the three-level image data creating section 115 creates the three-level image data as region segmented image data by performing negative logical addition of the first bi-level image data obtained by binarizing the R component and the second bi-level image data obtained by binarizing the result of the principal component analysis to discriminate the cytoplasm region.

Figure 23:
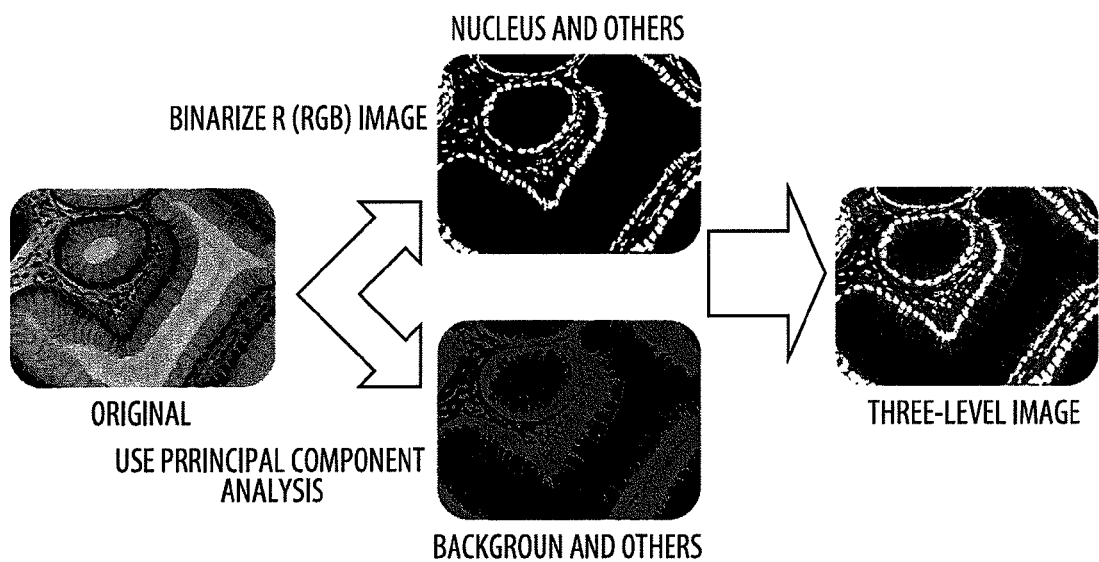
FIG. 23 illustrates image processing in the embodiment of FIG. 20.

As with the present embodiment, the conducted experiments have proved that if the second bi-level image data is obtained from the principal component analysis of the histopathological image data, the background region and the cytoplasm region can be discriminated more clearly than when the second bi-level image data is obtained from the YUV image data as shown in FIG. 1. To discriminate the background and cytoplasm regions, separation of only the V component from the YUV image data of the weakly stained histopathological image is not sufficient, which results in large overlapping distribution of the pixels belonging to the background regions and the pixels belonging to the cytoplasm regions. This is because discrimination of the background regions from the other regions primarily depends upon the relative color density and is largely affected by the relative color density. In contrast therewith, the principal component analysis may obtain a direction in which dispersion is maximized, namely, overlapping distribution is minimized, thereby clearly separating the background regions from the other regions. FIG. 23 illustrates image processing in the present embodiment. As can be known from the comparison of FIG. 23 with FIG. 4, in the present embodiment, the background, cytoplasm, and nucleus regions are segmented more clearly than the region segmented image data shown in FIG. 4 which is obtained in the embodiment of FIG. 1.

After clipping the background region, the cytoplasm and nucleus regions can be separated from each other and extracted. The nucleus region can more readily be clipped by binarizing the R component of the cytoplasm and nucleus regions by the binarization method based on discriminant analysis (Otsu's binarization method).

As with the first embodiment, accuracy of image recognition based on the HLAC features can be increased by weighting the background, cytoplasm, and nucleus regions of a region segmented image according to the pathologist's degree of attention. For example, the best image recognition is obtained when the level values of pixels belonging to the background and cytoplasm regions are fixedly set to 0and 2respectively, and the level value of pixels belonging to the nucleus regions is set to 14.

Figure 24:
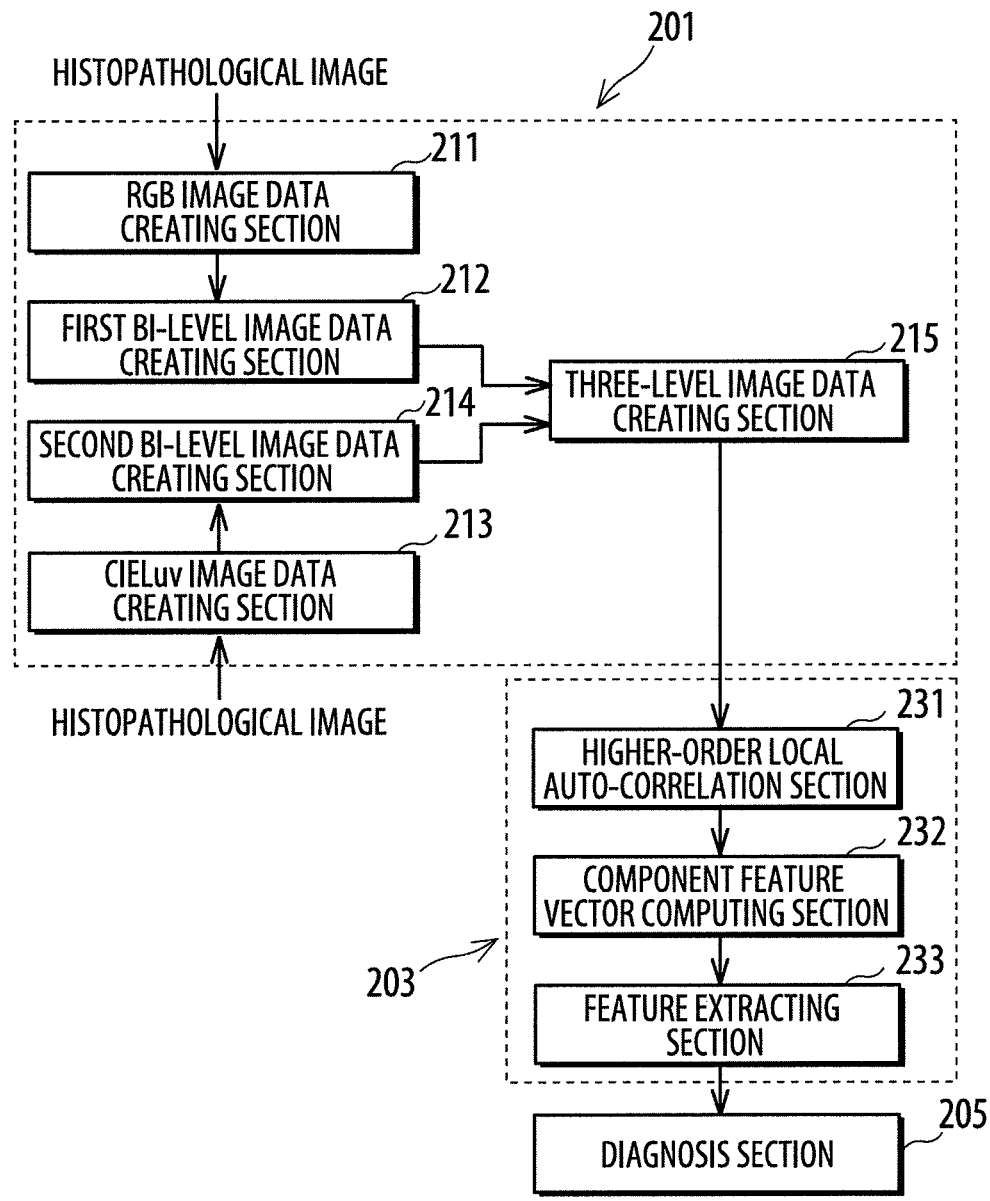
FIG. 24 is a block diagram illustrating a region segmented image data creating system for histopathological images, which is different from the one shown in FIG. 1, in another embodiment of the present invention.
Figure 25:
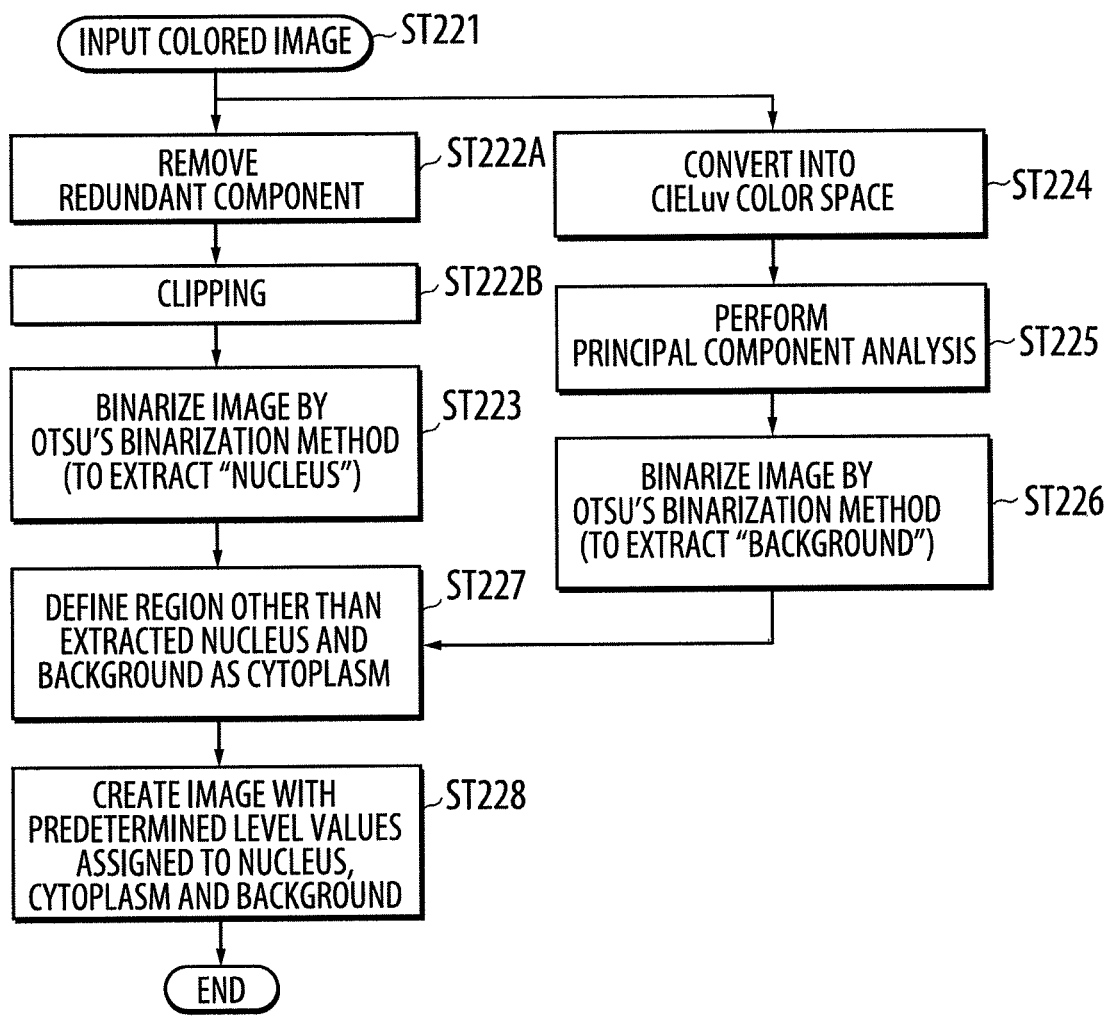
FIG. 25 is a flowchart showing an algorithm of creation of three-level images to be implemented in software used in the pathological diagnosis device of FIG. 24.

FIG. 24 is a block diagram illustrating another pathological diagnosis device. The pathological diagnosis device in this embodiment includes a region segmented image data creating system 201 for histopathological images which is different from the region segmented image data creating system 1 shown in FIG. 1, a feature extracting system 203 for histopathological images, and a diagnosis section 205. FIG. 25 is a flowchart showing an algorithm of assignment of three levels to be implemented in software used in the pathological diagnosis device of FIG. 24.

In the embodiment of FIG. 24, the principal component analysis is employed to segment the histopathological image into a nucleus region, a cytoplasm region, and a background region without relying on the staining conditions of a specimen. The specimen is stained with hematoxylin and eosin. The nucleus region is stained in violet-blue with hematoxylin. Although the staining density differs, the B component is higher than other components in the nucleus region as compared with the other regions in respect of the respective components in the RGB color space. This phenomenon is universally true to the histopathological specimens stained with hematoxylin and eosin regardless of different staining conditions. To extract the nucleus region from the histopathological specimen image, a gray scaled image is created, having an emphasized differential value between the B and R components in the RGB color space. Then, the gray scaled image is binarized to extract the nucleus region. In the present embodiment, the first bi-level image data creating section 212 performs redundant component removal in step ST222A, clipping in step ST222B, and binarization. The second bi-level image data creating section 214 performs the principal component analysis on CIELuv image data output from a CIELuv image data creating section 213, thereby creating the second bi-level image data in which the background regions can be discriminated from the other regions. In this regard, the present embodiment is different from the embodiment of FIG. 1. Further, in the present embodiment, a higher-order local auto-correlation feature computing section 231 of the feature extracting system 203 for histopathological images computes co-occurrence between a color index (for example, a color number) for a reference point of the result of scanning using a plurality of local pattern masks and a color index (for example, a color number) for a correlating point located in a displacement direction. Thus, the present embodiment is different from the embodiment of FIG. 1 in that so-called CILAC is employed. In other regards, the present embodiment is the same as the embodiment of FIG. 1. The steps shown in FIGS. 24 and 25 are allocated reference numbers defined by adding 200 to reference numbers of the counterparts of FIGS. 1 and 3, and descriptions thereof are omitted. For details on the specific steps of CILAC, refer to the "Color Image Feature Extraction Using Color Index Local Autocorrelation", Takumi KOBYASHI, et al., 2009IEEE International Conference on Acoustics, Speech and Signal Processing, pp. 1057-1060, 2009.

The first bi-level image data creating section 212 removes a redundant component or reduces redundancy in step ST222A of FIG. 25 which is a step of reducing color information. The nucleus regions of the histopathological specimen are stained in violet-blue with hematoxylin. Although the staining density differs, the B component is higher than other components in the nucleus regions as compared with the other regions in respect of the respective components in the RGB color space. To remove a redundant component which is not associated with the nucleus regions, the pixel value is set to zero (0) if the result of subtracting the B component from the R component in the RGB color space in respect of all of the pixels of the histopathological image exceeds zero (0). Such removal of redundant component can remove pixel information including many B components which may pose a bar to extraction of the nucleus regions.

Next, in step ST222B of clipping, to create an image having an emphasized nucleus region, the R component is subtracted from the B component in the RGB color space in respect of all of the pixels of the histopathological image with the redundant component removed. If the result B' of the subtraction is equal or more than a predetermined value, taking account of the noise reflected in the histopathological specimen image and non-uniform staining in the histopathological specimen image, the predetermined value is assigned to the result B', and clipping is done such that the result B' may be equal to or less than the predetermined value. For example, 30 which has been predetermined in a preliminary experiment may be used as the predetermined value. The predetermined value may appropriately be changed according to the staining conditions or the like. In step ST223, the value B' thus obtained for each clipped pixel is regarded as image data for creating the first bi-level image data for binarization. Such clipping may considerably reduce the effect of the noise reflected in the histopathological specimen image and non-uniform staining in the histopathological specimen image.

Figure 26:
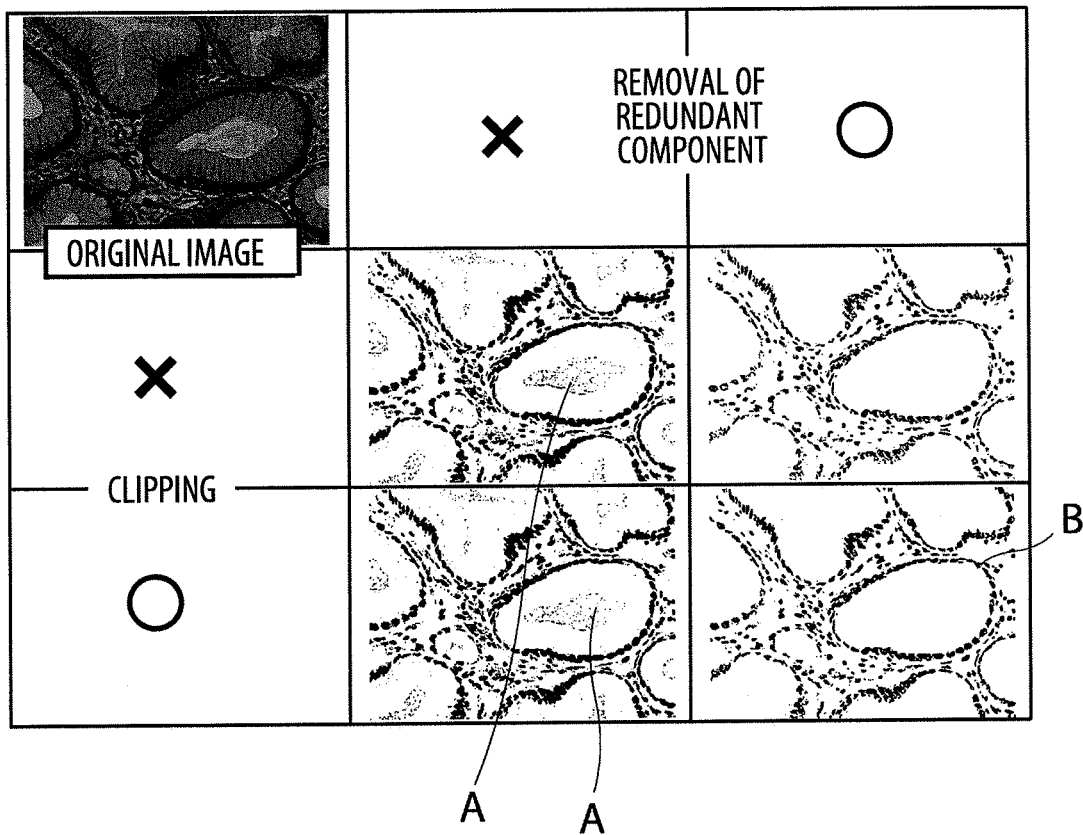
FIG. 26 shows images used in confirmation of effects of redundant component removal and clipping.

FIG. 26 shows images used in confirmation of effects of redundant component removal and clipping. As known from FIG. 26, a glandular cavity A which is the background is mistakenly extracted as nucleus if both redundant component and clipping are not done or only clipping is done. If only redundant component removal is done, the glandular cavity which is the background is not extracted, but the nucleus region becomes small. In contrast therewith, if both redundant component removal and clipping are done, the glandular cavity A is not extracted and the nucleus region B is more accurately extracted.

As with the first embodiment, bi-level image data obtained by binarizing the R component in the RGB color space by the binarization method based on discriminant analysis may be used as the first bi-level image data. The second bi-level image data creating section 214 of the present embodiment is configured to create the second bi-level image data in which the background regions can be discriminated from the other regions, based on the result of analyzing the second principal component axis obtained from the principal component analysis of CIELuv image data of the histopathological image. Here, the CIELuv image data refers to image data represented in the CIE color system as specified by the Commission International de l'Eclairage. The CIELus color system is a uniform color space designed such that a distance in a color space may correspond to a difference in color perceptually recognized by a human. This allows color identification and regional discrimination in the same manner as the pathologists do. For conversion from the RGB color system to the CIELuv color system, it is possible to use a method proposed in the "Color Engineering," Noboru OTA, Tokyo Denki University Press, 1993, for example.

More specifically, the second bi-level image data is created as follows: all of the pixel data of the histopathological image are converted into the CIELuv color system; all of the pixel data are projected onto the second principal component axis obtained by the principal component analysis; and the result is binarized by the binarization method based on discriminant analysis. Here, only the second principal component axis is used. This is because the conducted experiments have proved that it can visually be confirmed that the background region is represented most faithfully as compared with when other principal component axes are used. Of course, according to the staining conditions of the histopathological image, principal component axes other than the second principal component axis may be used. In this case, the second bi-level image data is created by projecting all of the pixel data of the histopathological image onto a principal component axis other than the second principal component axis for normalization, and binarizing the normalized data by the binarization method based on discriminant analysis. Further, all of the pixel data of the histopathological image may be projected onto a plurality of principal component axes for normalization. The normalized data are binarized to obtain a plurality of bi-level image data. Then, negative logical addition is performed on the thus obtained bi-level image data to create the second bi-level image data. Of course, logical addition or other operations may be used to create the second bi-level image data.

As with the first embodiment, the second bi-level image data maybe created by binarizing the V component in the YUV color space by the binarization method based on discriminant analysis.

Likewise, as with the second embodiment, the second bi-level image data may be created by projecting all of the pixel data of the histopathological image onto the first principal component axis obtained from the principal component analysis of all of the pixel data in the RGB color space, and binarizing the thus normalized data by the binarization method based on discriminant analysis. Of course, the normalized pixel data, which have been obtained by projecting all of the pixel data of the histopathological image onto a principal component axis other than the first principal component axis, may be binarized by the binarization method based on discriminant analysis to create the second bi-level image data. Further, the normalized pixel data, which have been obtained by projecting all of the pixel data of the histopathological image onto a plurality of principal component axes, may be binarized by the binarization method based on discriminant analysis to obtain a plurality of bi-level image data. Then, logical multiplication may be performed on the plurality of bi-level image data to obtain the second bi-level image data. Further, logical addition or other operations may be performed to obtain the second bi-level image data.

Figure 27A:
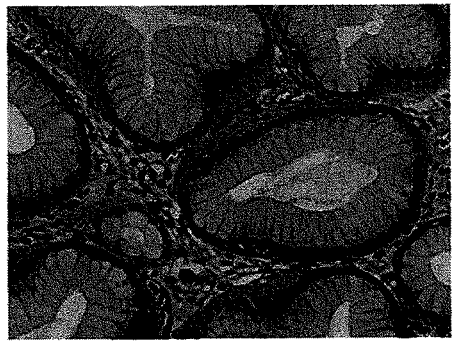
FIG. 27A is an original gray scaled image.
Figure 27B:
FIG. 27B is an image extracted in the embodiment of FIG. 1.
Figure 27C:
FIG. 27C is an image extracted in the embodiment of FIG. 20.
Figure 27D:
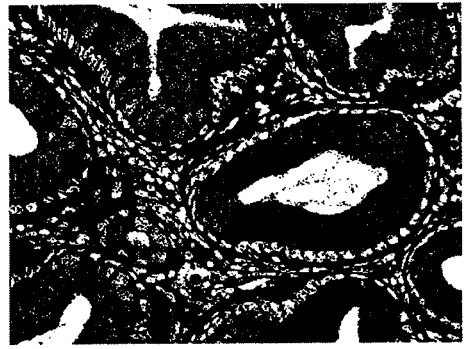
FIG. 27D is an image extracted in the embodiment of FIG. 24.

FIG. 27A is an original gray scaled image. FIG. 27B is an image extracted in the embodiment of FIG. 1, and the cytoplasm regions are partially extracted in white. FIG. 27C is an image extracted in the embodiment of FIG. 20, and most of the cytoplasm regions are extracted in white like the background regions. FIG. 27D is an image extracted in the present embodiment, and the background regions are extracted in white so as not to include the cytoplasm regions.

Now, a three-level image data creating section 215 of FIG. 24 will be described below. The three-level image data creating section 215 creates new bi-level image data by performing negative logical addition of the first bi-level image data and the second bi-level image data. In the third bi-level image data thus created, the cytoplasm regions and part of the nucleus regions are discriminated from the other regions. Next, the pixels belonging to the nucleus regions of the first bi-level image data are set to an arbitrary value A and other pixels are set to zero (0). Likewise, the pixels belonging to the background regions of the second bi-level image data are set to an arbitrary value B and other pixels are set to zero (0). Further, the pixels belonging to the cytoplasm regions and a part of the nucleus regions of the third bi-level image data are set to an arbitrary value C and other pixels are set to zero (0). Then, these three bi-level images are overlaid in the following steps. The pixels of the third bi-level image data, which are located at corresponding positions to the pixels of the second bi-level image data to which the arbitrary value B is set, are overwritten with the arbitrary value B. As a result, in the third bi-level image data, the pixels belonging to the background regions are set to the arbitrary value B, the pixels belonging to the cytoplasm regions and a part of the nucleus regions are set to the arbitrary value C, and the pixels belonging to the remaining part of the nucleus regions are set to zero. Following that, the pixels of the third bi-level image data, which are located at corresponding positions to the pixels of the first bi-level image data to which the arbitrary value A is set, are overwritten with the arbitrary value A. As a result, in the third bi-level image data, the pixels belonging to the background regions are set to the arbitrary value B, the pixels belonging to the cytoplasm regions are set to the arbitrary value C, and the pixels belonging to the nucleus regions are set to the arbitrary value A. After that, appropriate level values are set to the respective regions. For example, a level value of 0 is set to the background regions, a level value of 2 to the cytoplasm regions, and a level value of 14 to the nucleus regions. Thus, three-level image data is created.

Figures 28A, 28B:
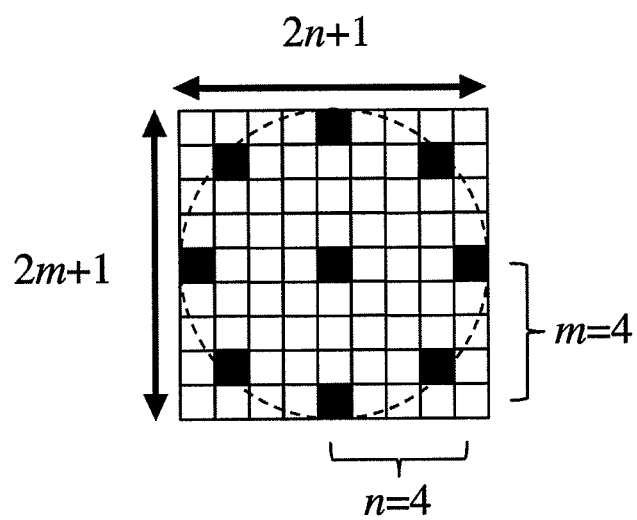
FIG. 28A illustrates different mask candidates (blocks in black and shaded blocks) for forming a local pattern mask.
FIG. 28B is a table of coordinates of the determined mask candidates.

FIG. 28A illustrates different mask candidates (blocks in black and shaded blocks) for forming a local mask pattern used in the present embodiment. FIG. 28B is a table of coordinates of the determined mask candidates.

Eight mask candidates in the mask region are defined as having coordinates of the intersections of the following two equations, assuming an XY coordinate system where the center mask has a coordinate of (0,0).

$$(x^2/n^2)+(y^2/m^2)=1 \text{ and}$$

$$y=(m/n)x \text{ or } y=-(m/n)x \text{ or } y=0 \text{ or } x=0.$$

If the m is equal to the n, in the present embodiment, m=n=4, eight mask candidates are located at apexes of an octagon centering on the center mask as shown in FIG. 28A. FIG. 28B shows the coordinates of the mask candidates. Now, the effect of the local pattern mask consisting of the center mask and the eight mask candidates will be described below by comparing FIG. 10A with FIG. 10B. For the local pattern mask shown in FIG. 10B, an absolute value of a difference between the Euclidean distance from the mask located at the corner of the mask region to the center mask and the Euclidean distance from the mask located in the middle of each side of the mask region to the center mask is defined as $\Delta D1$. In the local pattern mask shown in FIG. 28A, an absolute value of a difference between the Euclidean distance from the mask located right above the center mask (or left above, right below, or left below the center mask) to the center mask and the Euclidean distance from the mask located in the middle of each side of the mask region to the center mask is defined as $\Delta D2$. It is clearly known from the figures that $\Delta D2 \leq \Delta D1$. Here, among a plurality of local pattern masks, those local pattern masks which can be considered to be equivalent to each other when rotated by 45° are regarded as belonging to the same group. Taking account of the steps of generating rotation-invariant feature vectors, it is apparent that the local pattern mask shown in FIG. 28A has higher invariance. Therefore, it can be considered that the local pattern mask shown in FIG. 28A may extract higher quality feature vectors of the histopathological image.

As with the first embodiment, such mask arrangement as shown in FIG. 10B may be used.

The HLAC features used in the previous embodiment may attain fairly good accuracy of judge. However, when the HLAC features are calculated based on the total sum of multiplications of pixel values, appropriateness of setting of level values allocated to pixels tends to significantly affect the accuracy of judge. In the present embodiment, a mask pixel multiplying section 231 computes co-occurrence between a color index (for example, a color number) for a reference point of the result of scanning using a plurality of local pattern masks and a color index (for example, a color number) for a correlating point located in a displacement direction. The feature extracting method called CILAC (Color Index Local Auto-correlation) is employed in the present embodiment. For details, refer to the "Color image feature extraction using color index local auto-correlations" published by T. KOBAYASHI and N. OTSU in pp. 1057-1060of the Journal titled "Acoustic, Speech and Signal Processing, 2009,ICASSP 2009" of the IEEE International Conference held in Taipei, Taiwan for the period of 19to 24Apr. 2009.

Co-occurrence may be defined as tendency that different events occur simultaneously. Namely, in the histopathological image, the relationship among neighboring pixels specified by a local pattern mask may be represented by a combination of three classes, nucleus, cytoplasm, and background. Frequency of occurrence of all of the combinations may be extracted as a feature.

The CILAC features may be represented as vectors obtained by concatenating 0-order, 1-order, and 2-order auto-correlations when the number of order for higher-order correlation is any of 0, 1,and 2. The 0-order, 1-order, and 2-order auto-correlations $R_0(i)$, $R_1(i,j,a)$, and $R_2(i,j,k,a,b)$ are represented in the following equations.

$$R_0(i)=\Sigma_r f_i(r)$$

$$R_1(i,j,a)=\Sigma_r f_i(r)f_j(r+a)$$

$$R_2(i,j,k,a,b)=\Sigma_r f_i(r)f_j(r+a)f_k(r+b)$$

where r denotes a reference pixel; and a and b denote displacement vectors from r; $f_i(x)$ is a function having a value of 1when a pixel x takes a color label i and otherwise having a value of 0;and i included in $\{1,\ldots,D\}$, j included in $\{1,\ldots,D\}$, k included in $\{1,\ldots,D\}$ denote color labels. In the present embodiment, D=3,and color labels 1, 2, 3are label values respectively given to the pixels belonging to the nucleus region, the pixels belonging to the cytoplasm region, and the pixels belonging to the background region. The displacement vectors a and b are regulated by the positions of nine mask candidates included in the local pattern mask. The 0-order (zeroth) correlation $R_0(i)$ is a vector having the length of 3since i may take one of three values (color labels). The 1-order (first) correlation $R_1(i,j,a)$ is a vector having the length of 3×3×8since i and j may each take one of three values (color labels), and the displacement vector may take one of eight directions. The 2-order (second) correlation $R_2(i,j,k,a,b)$ is a vector having the length of 3×3×3×8×7since i, j, and k may take one of three values (color labels) and the displacement vector may take two of eight directions. If all correlations up to the second order are concatenated, the resulting order is 1587. As with the previous embodiment, the CILAC features are transformed into rotation-invariant and flip-invariant features. In the present embodiment, the CILAC features xi are transformed into 63-order rotation-invariant and flip-invariant features yj (j=1, . . . , 63).

If the CILAC are used to extract features, it is not necessary to assign level values to the pixels belonging to the respective regions of nucleus, cytoplasm, and background according to the nature of the histopathological image. As a result, there is no risk that accuracy of anomaly detection may be decreased due to inappropriate assignment of the level values, thereby attaining stabilized support for histopathological diagnosis.

Further, importance is placed on information on the region of nucleus and relationship between the regions of nucleus and cytoplasm in the process of feature extraction. In the CILAC, the local pattern masks which represent only the region of nucleus and the relationship between the regions of nucleus and cytoplasm may be used.

Figure 29:
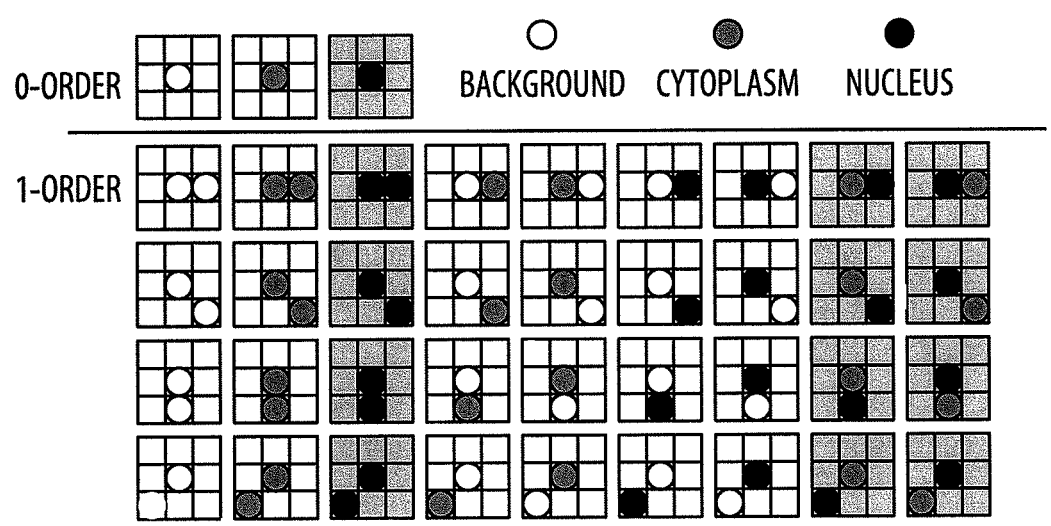
FIG. 29 illustrates example one-order CILAC local pattern masks of 3×3matrix.

FIG. 29 illustrates example CILAC local pattern masks of 3×3matrix up to the one-order. In basic scanning methods, all of the local pattern masks shown in FIG. 29 are used. However, if the local pattern masks to be used are limited to those which represent only the region of nucleus and the relationship between the regions of nucleus and cytoplasm, only the local pattern masks having colored cells are used. Counting the masks up to the second order, the number of local pattern masks amounts to 1587. If the features are transformed with consideration given to the rotation invariance and flip invariance, the number of invariant feature groups is 63. Further, if the local pattern masks to be used are limited to those which represent only the region of nucleus and the relationship between the regions of nucleus and cytoplasm, the number of local pattern masks is 153. In this case, if the features are transformed with consideration given to the rotation invariance and flip invariance, the number of invariant feature groups is 15.

As with the first embodiment, instead of the CILAC features, HLAC features may be extracted from a region segmented histopathological image having level values assigned to the respective regions. It goes without saying that transformation into rotation-invariant and flip-invariant features are not always necessary.

The experiment for cross-validation was conducted on cancerous tissue samples using the limited number of local pattern masks, namely, the one consisting of eight mask candidates located at apexes of an octagon centering on the center mask as shown in FIG. 28A. In the conducted experiment for cross-validation, the over-detection rate (over-detections/ normal samples) was 8.3%. In the embodiment using the method of HLAC feature extraction, the over-detection rate was 15.7% in the experiment for cross-validation of cancerous tissue samples using the local pattern mask consisting of eight mask candidates located at apexes of an octagon centering on the center mask as shown in FIG. 28A. It follows from the foregoing that the CILAC technique is better than the HLAC technique as the feature extracting method for histopathological images. Further, it has been confirmed that over-detection maybe suppressed by using only the local pattern masks which represent only the region of nucleus and the relationship between the regions of nucleus and cytoplasm.

According to the present invention, it is not necessary to pre-define the details of features of cancer, and it is possible to detect unknown lesional anomalies which have not been discovered before by learning the features of normal tissue images that have been collected so far.

Industrial Applicability

In the present invention, it is possible to create the first bi-level image data in which the nucleus regions can be discriminated from the other regions. It is also possible to create the second bi-level image data in which the background regions can be discriminated from the other regions. Then, the nucleus regions are discriminated by performing negative logical addition of the first and second bi-level image data. Thus, the three-level image data is created as region segmented image data. According to the present invention, it is possible to create a region segmented image in which the background, cytoplasm, and nucleus regions are more clearly discriminated than before.

REFERENCE SIGNS LIST 1, 101 Region segmented image data creating system for histopathological images 3, 103 Feature extracting system for histopathological images 5, 105 Diagnosis section 11, 111 RGB image data creating section 12, 112 First bi-level image data creating section
13 YUV Image data creating section
14, 114 Second bi-level image data creating section
15, 115 Three-level image data creating section
31, 131 Higher-order local auto-correlation feature computing section
231 Mask pixel value computing section
32, 132 Component feature vector computing section
33, 133 Feature extracting section

The invention claimed is:

1. A feature extracting system for histopathological images comprising:
   a region segmented image data creating system for histopathological images configured to create region segmented image data required to create a region segmented image in which background regions, cytoplasm regions, and nucleus regions in histopathological image are clearly discriminated;
   a higher-order local auto-correlation feature computing section configured to compute higher-order local auto-correlation features by scanning a segmented histopathological image created by the region segmented image data creating system using a plurality of predetermined local pattern masks;
   a component feature vector computing section configured to obtain a weighted sum of the higher-order local auto-correlation features by adding the higher-order local auto-correlation features belonging to the same invariant feature group which consists of a plurality of local pattern masks which can be considered to be equivalent to each other when they are flipped and rotated by 45 degrees or multiples of 45 degrees; and
   a feature extracting section configured to extract the features of the histopathological image based on the weighted sum of the higher-order local auto-correlation features, wherein:
   the region segmented image data creating system for histopathological images includes:
      a first bi-level image data creating section operable to create first bi-level image data, in which the nucleus regions can be discriminated from the other regions, from the histopathological image data;
      a second bi-level image data creating section operable to create second bi-level image data, in which the background regions can be discriminated from the other regions, from the histopathological image data; and
      a three-level image data creating section operable to create three-level image data as the region segmented image data by computing a negative logical addition of the first bi-level image data and the second bi-level image data in order to clarify cytoplasm regions.

2. A region segmented image data creating system for histopathological images configured to create region segmented image data required to create a region segmented image in which background regions, cytoplasm regions, and nucleus regions in histopathological image are clearly discriminated, the region segmented image data creating system comprising:
   a first bi-level image data creating section operable to create first bi-level image data in which the nucleus regions can be discriminated from the other regions, from the histopathological image data;
   a second bi-level image data creating section operable to create second bi-level image data in which the background regions can be discriminated from the other regions, from the histopathological image data; and
   a three-level image data creating section operable to create three-level image data as the region segmented image data by computing a negative logical addition of the first bi-level image data and the second bi-level image data in order to clarify cytoplasm regions.

3. The region segmented image data creating system according to claim 2, wherein:
   the first bi-level image data creating section creates the first bi-level image data in which the nucleus regions can be discriminated from the other regions by separating an R component from RGB image data of the histopathological image and binarizing the separated R component by binarization method based on discriminant analysis.

4. The region segmented image data creating system according to claim 3, wherein:
   the first bi-level image data creating section separates the R component from the RGB image data of the histopathological image by projecting all of pixel data of the RGB image data with respect to an R axis in an RGB color space.

5. The region segmented image data creating system according to claim 3, wherein:
   the redundancy of the RGB image data is reduced and information is accordingly reduced by subtracting a B component from an R component in an RGB color space in respect of each pixel of the histopathological image and setting zero values to pixels when a subtraction result is less than zero.

6. The region segmented image data creating system according to claim 2, wherein:
   the second bi-level image data creating section creates the second bi-level image data in which the background regions can be discriminated from the other regions by separating a V component from YUV image data of the histopathological image and binarizing the separated V component by binarization method based on discriminant analysis.

7. The region segmented image data creating system according to claim 6, wherein:
   the second bi-level image data creating section separates the V component from the YUV image data of the histopathological image by projecting all of pixel data of the YUV image data with respect to a V axis in a YUV color space.

8. The region segmented image data creating system according to claim 2, wherein:
   the second bi-level image data creating section creates the second bi-level image data by performing principal component analysis on the histopathological image.

9. The region segmented image data creating system according to claim 8, wherein:
   the second bi-level image data creating section creates the second bi-level image data in which the background regions can be discriminated from the other regions by performing the principal component analysis on all of pixel data of the histopathological image converted into CIELuv image data and binarizing second principal component scores of the all of the pixel data by binarization method based on discriminant analysis.

10. The region segmented image data creating system according to claim 9, wherein:
    the CIELuv image data is obtained by converting the RGB image data of the histopathological image into XYZ image data, computing an L value based on a Y value, and computing u and v based on an XYZ value and the L value.

11. The region segmented image data creating system according to claim 2, wherein:
the second bi-level image data creating section creates the second bi-level image data in which the background regions can be discriminated from the other regions by performing the principal component analysis on all of pixel data of the histopathological image data and binarizing first principal component scores of all of the pixel data by binarization method based on discriminant analysis.

12. A feature extracting system for histopathological images comprising:
a higher-order local auto-correlation computing section configured to compute higher-order local auto-correlation features by scanning a segmented histopathological image created by the region segmented image data creating system of claim 3 using a plurality of predetermined local pattern masks;
a component feature vector computing section configured to obtain a weighted sum of the higher-order local auto-correlation features by adding the higher-order local auto-correlation features belonging to the same invariant feature group which consists of a plurality of local pattern masks which can be considered to be equivalent to each other when they are flipped and rotated by 45 degrees or multiples of 45 degrees; and
a feature extracting section configured to extract the features of the histopathological image based on the weighted sum of the higher-order local auto-correlation features.

13. The feature extracting system for histopathological images according to claim 12, wherein:
the plurality of local pattern masks formed by selecting as a center mask a mask candidate located in the center of a mask region in which a plurality of mask candidates are arranged in a matrix, the mask region consisting of (2m+1)X(2n+1) cells where m and n are integers, and further selecting an arbitrary number of mask candidates from the mask region, the arbitrary number being zero or more.

14. The feature extracting system for histopathological images according to claim 13, wherein:
the mask candidates other than the center mask are selected such that the distance from each mask candidate to the center mask is equal.

15. The feature extracting system for histopathological images according to claim 13, wherein:
assuming an XY coordinate system where the center mask has a coordinate of (0, 0), the mask candidates other than the center mask have a coordinate of an intersection of the following two equations:

$(x^2/n^2)+(y^2/m^2)=1$ and $y=(m/n)x$ or $y=-(m/n)x$ or $y=0$ or $x=0$.

16. The feature extracting system for histopathological images according to claim 15, wherein:
the m is equal to the n;
there are eight mask candidates other than the center mask, which are available as the local pattern masks.

17. The feature extracting system for histopathological images according to claim 12, wherein:
the local pattern masks which represent only the region of nucleus and the relationship between the regions of nucleus and cytoplasm are used.

18. A feature extracting method for histopathological images comprising the steps of:
computing higher-order local auto-correlation features for a plurality of predetermined local pattern masks by scanning a histopathological image individually using the predetermined local pattern masks and computing the higher-order local auto-correlation features for the respective local pattern masks;
obtaining a weighted sum of the higher-order local auto-correlation features by adding the higher-order local auto-correlation features belonging to the same invariant feature group which consists of a plurality of local pattern masks which can be considered to be equivalent to each other when they are flipped and rotated by 45 degrees or multiples of 45 degrees; and
extracting the features of the histopathological image based on the weighted sum of the higher-order local auto-correlation features.

19. The feature extracting method for histopathological images according to claim 18, wherein:
the local pattern masks which represent only the region of nucleus and the relationship between the regions of nucleus and cytoplasm are used.

20. The region segmented image data creating system according to claim 3, wherein:
the redundancy of the RGB image data is reduced and information is accordingly reduced by subtracting a B component from an R component in an RGB color space in respect of each pixel of the histopathological image and setting zero values to pixels when a subtraction result is less than zero; and
the RGB image data is subjected to clipping in such a manner that the B component falls within a predetermined region so that when a subtraction result, which is obtained by subtracting an R component from a B component in the RGB color space in respect of each pixel contained in the RGB image data of which redundancy has been reduced, is more than a predetermined value, the subtraction value becomes the predetermined value.

21. The region segmented image data creating system according to claim 4, wherein:
the redundancy of the RGB image data is reduced and information is accordingly reduced by subtracting a B component from an R component in an RGB color space in respect of each pixel of the histopathological image and setting zero values to pixels when a subtraction result is less than zero; and
the RGB image data is subjected to clipping in such a manner that the B component falls within a predetermined region so that when a subtraction result, which is obtained by subtracting an R component from a B component in the RGB color space in respect of each pixel contained in the RGB image data of which redundancy has been reduced, is more than a predetermined value, the subtraction value becomes the predetermined value.

22. The region segmented image data creating system according to claim 4, wherein:
the redundancy of the RGB image data is reduced and information is accordingly reduced by subtracting a B component from an R component in an RGB color space in respect of each pixel of the histopathological image and setting zero values to pixels when a subtraction result is less than zero.

* * * * *